(12) United States Patent
Woodard et al.

(10) Patent No.: US 10,175,054 B2
(45) Date of Patent: Jan. 8, 2019

(54) PREDICTING AND UTILIZING VARIABILITY OF TRAVEL TIMES IN MAPPING SERVICES

(71) Applicant: Microsoft Technology Licensing, LLC, Redmond, WA (US)

(72) Inventors: Dawn Woodard, Redmond, WA (US); Eric J. Horvitz, Kirkland, WA (US); Galina Nogin, Redmond, WA (US); Paul B. Koch, Redmond, WA (US); David Racz, Redmond, WA (US); Moises Goldszmidt, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 42 days.

(21) Appl. No.: 14/684,108

(22) Filed: Apr. 10, 2015

(65) Prior Publication Data

US 2016/0202074 A1 Jul. 14, 2016

Related U.S. Application Data

(60) Provisional application No. 62/102,077, filed on Jan. 11, 2015.

(51) Int. Cl.
*G01C 21/34* (2006.01)
*G06Q 10/04* (2012.01)

(52) U.S. Cl.
CPC .......... *G01C 21/34* (2013.01); *G06Q 10/047* (2013.01)

(58) Field of Classification Search
None
See application file for complete search history.

(56) References Cited

U.S. PATENT DOCUMENTS 5,913,917 A * 6/1999 Murphy .............. B60R 16/0232
701/123
6,178,374 B1 * 1/2001 Mohlenkamp ... G08G 1/096716
340/905

(Continued)

FOREIGN PATENT DOCUMENTS

EP         1657693         5/2006
EP         1657693 A2 *    5/2006  .......... G08G 1/0104

(Continued)

OTHER PUBLICATIONS

Horovitz from Google patents indicating the paragraph numbers.*

(Continued)

*Primary Examiner* — Jean Paul Cass

(57) ABSTRACT

A system for predicting variability of travel time for a trip at a particular time may utilize a machine learning model including latent variables that are associated with the trip. The machine learning model may be trained from historical trip data that is based on location-based measurements reported from mobile devices. Once trained, the machine learning model may be utilized for predicting variability of travel time. A process may include receiving an origin, a destination, and a start time associated with a trip, obtaining candidate routes that run from the origin to the destination, and predicting, based at least in part on the machine learning model, a probability distribution of travel time for individual ones of the candidate routes. One or more routes may be recommended based on the predicted probability distribution, and a measure of travel time for the recommended route(s) may be provided.

20 Claims, 5 Drawing Sheets

(56) References Cited

U.S. PATENT DOCUMENTS

| | | | |
|---|---|---|---|
| 6,317,686 B1 | 11/2001 | Ran | |
| 6,370,475 B1 * | 4/2002 | Breed | B60N 2/2863 340/436 |
| 6,526,352 B1 * | 2/2003 | Breed | G01C 21/3697 342/357.31 |
| 7,233,861 B2 | 6/2007 | Van Buer et al. | |
| 7,375,649 B2 * | 5/2008 | Gueziec | H04W 4/029 340/905 |
| 7,454,288 B2 * | 11/2008 | Parikh | G08G 1/0104 701/117 |
| 7,698,055 B2 | 4/2010 | Horvitz et al. | |
| 7,702,452 B2 | 4/2010 | Kantarjiev et al. | |
| 8,024,111 B1 | 9/2011 | Meadows et al. | |
| 8,090,530 B2 | 1/2012 | Horvitz | |
| 8,700,296 B2 | 4/2014 | Chapman et al. | |
| 8,781,718 B2 | 7/2014 | Margulici et al. | |
| 9,217,649 B1 * | 12/2015 | Dror | G01C 21/00 |
| 9,702,709 B2 * | 7/2017 | Forstall | G01C 21/3617 |
| 2002/0115430 A1 * | 8/2002 | Hall | G06Q 10/10 455/414.1 |
| 2002/0198632 A1 * | 12/2002 | Breed | B60N 2/2863 701/1 |
| 2003/0191568 A1 * | 10/2003 | Breed | B60W 40/06 701/36 |
| 2004/0088107 A1 * | 5/2004 | Seligmann | G01C 21/36 709/224 |
| 2004/0153232 A1 * | 8/2004 | Wada | F16H 61/08 701/55 |
| 2005/0060069 A1 * | 3/2005 | Breed | B60N 2/2863 701/408 |
| 2005/0134440 A1 * | 6/2005 | Breed | B60N 2/2863 340/435 |
| 2007/0106465 A1 * | 5/2007 | Adam | G01C 21/3492 701/533 |
| 2008/0215202 A1 * | 9/2008 | Breed | G01C 21/3611 701/25 |
| 2010/0253542 A1 * | 10/2010 | Seder | G01S 7/22 340/932.2 |
| 2015/0006071 A1 | 1/2015 | Cai | |
| 2015/0141043 A1 * | 5/2015 | Abramson | G01C 21/34 455/456.1 |
| 2016/0003620 A1 * | 1/2016 | Kapoor | G01C 21/00 701/400 |
| 2016/0202074 A1 * | 7/2016 | Woodard | G06Q 10/047 701/465 |
| 2017/0008521 A1 * | 1/2017 | Braunstein | G01C 21/32 |

FOREIGN PATENT DOCUMENTS

| | | | | |
|---|---|---|---|---|
| GB | 2431261 A * | 4/2007 | | G01C 21/3492 |
| WO | WO 2004021306 A2 * | 3/2004 | | G01C 21/3469 |
| WO | WO2008005187 | 1/2008 | | |
| WO | WO2009006059 | 2/2009 | | |
| WO | WO 2013123512 A1 * | 8/2013 | | G08G 1/00 |

OTHER PUBLICATIONS

Liu, Henry, X. et al., Uncovering the Contribution of Travel Time Reliability to Dynamic Route Choice using Real Time Loop Data, Transportation Research Part A: Policy and Practice, vol. 38, Issue 6, Jul. 2004, pp. 435-453 (https://doi.org/10.1016/j.tra.2004.03.003) (hereinafter "Liu").*

Miao Lin, and Wen Jing Hsu, Mining GPS data for mobility patterns: A Survey, Pervasive and Mobile Computing, vol. 12, Jun. 2014, pp. 1-16 (https://www.sciencedirect.com/science/article/pii/S1574119213000825?via%3Dihub) (Jul. 8, 2013) (hereinafter "Lin").*

Budge, et al., "Empirical Analysis of Ambulance Travel Times: The Case of Calgary Emergency Medical Services", In Journal of Management Science, vol. 56, Issue 4, Apr. 1, 2010, 2 pages.

Charle, et al., "Estimating Route Travel Time Variability from Link Data by Means of Clustering", In Proceedings of 12th World Congress on Transport Research, Jul. 11, 2010, 16 pages.

Erdogan, et al., "Ambulance Location for Maximum Survival", In Proceedings of Naval Research Logistics, vol. 55, Issue 1, Feb., 2008, 32 pages.

Gelman, Andrew, "Prior Distributions for Variance Parameters in Hierarchical Models", In Proceedings of Bayesian Analysis, vol. 1, No. 3, May 31, 2006, pp. 515-534.

Hofleitner, et al., "Arterial Travel Time Forecast with Streaming Data: A Hybrid Approach of Flow Modeling and Machine Learning", In Proceedings of Transportation Research Part B: Methodological, vol. 46, Issue 9, Nov. 2012, 27 pages.

Hofleitner, et al., "Learning the Dynamics of Arterial Traffic from Probe Data Using a Dynamic Bayesian Network", In Proceedings of IEEE Transactions on Intelligent Transportation Systems, vol. 13, Issue 4, Dec. 2012, pp. 1679-1693.

Horvitz, Eric, "Predictive Analytics for Traffic", Published on: Aug. 15, 2013 Available at: <<http://research.microsoft.com/en-us/projects/clearflow/>>, 6 pages.

Hunter, et al., "Arriving on Time: Estimating Travel Time Distributions on Large-Scale Road Networks", In Proceedings of Computing Research Repository, Jan. 2013, 9 pages.

Hunter, et al., "Large-Scale Estimation in Cyberphysical Systems Using Streaming Data: A Case Study with Arterial Traffic Estimation", In Proceedings of IEEE Transactions on Automation Science and Engineering, vol. 10, Issue 4, Oct. 2013, pp. 884-898.

Hunter, et al., "The Path Inference Filter: Model-Based Low-Latency Map Matching of Probe Vehicle Data", In Proceedings of Tenth Workshop on the Algorithmic Foundations of Robotics, Feb. 28, 2013, 23 pages.

Itsumi, et al. "Latent Class Learning Model Using Probe Person Data: Formulation and Application for Departure Time", In Proceedings of European Transport Conference, Sep. 30, 2013, 4 pages.

Jenelius, et al., "Travel Time Estimation for Urban Road Networks Using Low Frequency Probe Vehicle Data", In Proceedings of Transportation Research Part B: Methodological, vol. 53, Jul. 2013, 29 pages.

Khosravi, et al., "Prediction Intervals to Account for Uncertainties in Travel Time Prediction", In Proceedings of IEEE Transactions on Intelligent Transportation Systems, vol. 12, Issue 2, Feb. 4, 2011, 21 pages.

Lei, et al., "Predicting Corridor-Level Travel Time Distributions Based on Stochastic Flow and Capacity Variations", Retrieved on: Jan. 5, 2015, Available at: <<http://onlinepubs.trb.org/onlinepubs/shrp2/RFPL38/L02QueuePredictionPaper.pdf>>, 30 pages.

Li, Ruimin, "Examining Travel Time Variability using AVI Data", In Proceedings of 26th Conference of Australian Institutes of Transport Research, Issue 36, Dec. 8, 2004, 16 pages.

Masiero, et al., "Travel Time Prediction using Machine Learning", In Proceedings of 4th ACM SIGSPATIAL International Workshop on Computational Transportation Science, Nov. 1, 2011, 5 pages.

Mazloumi, et al., "Using Traffic Flow Data to Predict Bus Travel Time Variability through an Enhanced Artificial Neural Network", In Proceedings of 12th World Congress on Transport Research, Jul. 11, 2010, 13 pages.

McLay, Laura A., "Emergency Medical Service Systems that Improve Patient Survivability", In Wiley Encyclopedia of Operations Research and Management Science, Jun. 15, 2010, 2 pages.

Meng, et al., "Maximum Likelihood Estimation via the ECM Algorithm: A General Framework", In Proceedings of Biometrika, vol. 80, No. 2, Jun. 1996, pp. 267-278.

Newson, et al., "Hidden Markov Map Matching through Noise and Sparseness", In Proceedings of 17th ACM SIGSPATIAL International Conference on Advances in Geographic Information Systems, Nov. 4, 2009, pp. 336-343.

Peer, et al., "Predicting Travel Time Variability for Cost-Benefit-Analysis", In Proceedings of Transportation Research Part A: Policy and Practice, vol. 46, Issue 1, Jan. 2012, 22 pages.

Prato, et al., "Latent Variables and Route Choice Behavior", In Journal of Transportation, vol. 39, Issue 2, Mar. 1, 2012, 3 pages.

Ramezani, et al., "On the Estimation of Arterial Route Travel Time Distribution with Markov Chains", In Proceedings of Transportation Research Part B: Methodological, vol. 46, Issue 10, Dec. 2012, pp. 1576-1590.

(56) References Cited

OTHER PUBLICATIONS

Westgate, et al., "Large-Network Travel Time Distribution Estimation, With Application to Ambulance Fleet Management", Retrieved on: Jan. 9, 2014, Available at: <<https://courses.cit.cornell.edu/dm484/papers/large_network_travel_time_estimation.pdf>>, 28 pages.

Westgate, et al., "Travel Time Estimation for Ambulances using Bayesian Data Augmentation", In Journal of The Annals of Applied Statistics, vol. 7, No. 2, Retrieved on: Jan. 9, 2014, 24 pages.

"Machine Learning—Wikipedia, the Free Encyclopedia", Retrieved From <<https://en.wikipedia.org/w/index.php?title=Machine_learning&oldid=641213101>>, Jan. 6, 2015, 12 Pages.

"International Search Report and Written Opinion Issued in PCT Application No. PCTUS2015067550", dated Mar. 29, 2016, 11 Pages.

\* cited by examiner

PREDICTING AND UTILIZING VARIABILITY OF TRAVEL TIMES IN MAPPING SERVICES

CROSS REFERENCE TO RELATED APPLICATIONS

This patent application claims the benefit of U.S. Provisional Patent Application Ser. No. 62/102,077 filed Jan. 11, 2015, entitled "PREDICTING AND UTILIZING VARIABILITY OF TRAVEL TIMES IN MAPPING SERVICES", which is hereby incorporated in its entirety by reference.

BACKGROUND

Computer-driven mapping services aid users in locating points of interest (e.g., particular buildings, addresses, and the like), among other things. Many mapping services also provide route planning applications that can suggest a fastest or most desirable route from an origin to a destination, and sometimes even provide a predicted travel time (e.g., driving time, walking time, etc.) for those routes. These predicted travel times typically represent an average (mean) travel time that can be obtained from historical trip data.

While the average travel time provides a fairly accurate prediction of travel time, it is not perfectly accurate for predicting the actual travel time. In other words, the average travel time is never going to give perfectly accurate results all of the time. At least for vehicular travel, this may be due in part to the considerable variability in driving time caused by differences in driver habits/behavior, unknown timing of traffic signals, and unobserved traffic, road, and/or weather conditions, to name only a few factors that contribute to driving time variability. Using the average travel time as a prediction of travel time does not account for the variability in travel time, which, in turn, negatively affects user experience. For instance, if the predicted travel time is underestimated, the user may be late, while if the predicted travel time is overestimated, the user may leave earlier than necessary, or may look to a third party mapping service in hopes of finding a route with a lower predicted travel time. Accordingly, a mapping service that suggests a route with a low average driving time, but high variability in driving time, is likely to result in poor user experience due to the inaccuracy of the travel time predictions.

SUMMARY

Described herein are techniques and systems for predicting variability of travel time for a trip that begins at an origin, at a start time, and ends at a destination. Initially, one can think of travel time for a particular route as being a quantity that has variability (i.e., future travel time on a given route is a random variable) due to various uncertainties. A machine learning model may be trained from historical trip data and used to predict the variability in (probability distribution of) travel time—a random variable—along a given route from the origin to the destination, at a particular time. In particular, the machine learning model approach solves what is referred to herein as the "dependence problem" through the use of latent variables (or "random effects") that are associated with the trip, thereby modeling the interdependence of sequential segments that constitute the trip.

The "dependence problem" refers to the observation that driving times on different segments (hereinafter "segments" may be used interchangeably with "links") that collectively constitute a route are closely related to one another. For example, if a person drives a vehicle faster than usual on the first segment of the route, then you would expect that person to drive the vehicle faster than usual on the other segments in the route as well. Likewise, the level of congestion that a driver experiences on the first segment of the trip is closely related to the level of congestion that the driver experiences on the second segment, the third segment, and so on. Thus, the dependence problem represents that the travel times along individual segments of a route are correlated, even after accounting for time of day and other explanatory factors.

The techniques and systems disclosed herein use machine learning methods to model the interdependence of travel times on route segments within the trip itself, as opposed to modeling interdependence across all of the segments in a particular network of segments, such as an entire road network. A method described in "Hofleitner, A., Herring, R., Abbeel, P., and Bayen, A., Learning the dynamics of arterial traffic from probe data using a dynamic Bayesian network. *IEEE Transactions on Intelligent Transportation Systems*, pp. 1679-1693, 2012a," takes the latter approach to predict variability in driving time; namely they consider latent variables that represent the level of traffic congestion on each road segment in an entire road map. The Hofleitner system is computationally intensive when implemented for predictions in highly interconnected road networks with complex traffic dynamics, leaving such an approach suitable for only small road networks.

The techniques and systems disclosed herein use a machine learning model that includes latent variables that are associated with a given trip, thereby ignoring the remainder of segments in a network that are not part of the trip in question. Because the latent variables are associated with the trip instead of the entire road map, the systems disclosed herein are more computationally efficient than systems, such as the Hofleitner system noted above, that model dependence across all of the segments in an entire road network.

Moreover, by modeling the segment interdependence within the trip, accurate predictions of travel time variability can be made for large networks of highly interconnected segments and complex traffic dynamics (e.g., commercial-scale road maps). The techniques and systems disclosed herein provide a comprehensive solution to the above-mentioned dependence problem that results in higher accuracy driving time variability predictions to further improve user experience.

Furthermore, by using latent variables associated with the trip instead of the road network, entities (e.g., vehicles) traveling on the same links at the same time are not required to have the same values of the latent variables. This is not the case for the method of Hofleitner, noted above. Because the latent variables capture (among other things) the level of congestion experienced by the vehicle, the machine learning model described herein reflects the reality that vehicles traveling in different lanes on the same segment/link can experience different levels of congestion, affecting their individual travel times. This occurs, for example, when vehicles line up to take a particular exit or turn, or when high-occupancy vehicle (HOV) lanes are available.

A machine learning model including latent variables that are associated with a trip may be trained from historical trip data, as reported by location-based measurements from mobile devices. Once trained, the model may be utilized for predicting travel time variability.

In some embodiments, a computer-implemented method of predicting variability of travel time for a trip includes receiving an origin, a destination, and a start time associated with a trip, obtaining candidate routes that run from the origin to the destination, and predicting, based at least in part on a machine learning model that includes latent variables that are associated with the trip, a probability distribution of travel time for individual ones of the candidate routes.

The predicted variability of travel time for the trip may then be incorporated into mapping service output. For instance, mapping service output may recommend one or more routes from the candidate routes that satisfy, or minimize, a criterion (e.g., a specified percentile of the travel time) based at least in part on the probability distribution. Mapping service output may further provide a measure of travel time for the recommended one or more routes that is based on the predicted probability distribution; for example, reporting a specified percentile of the travel time. By taking variability of travel time into account, routes may be suggested that are typically more desirable to users than those obtained by minimizing average driving time. Furthermore, the systems and techniques disclosed herein can improve the user experience by, for example, decreasing the chance of the user being late and/or leaving too early. In certain instances, high accuracy predictions of travel time variability can be quite valuable, such as in coordinating arrival of emergency vehicles that could dramatically improve survival rates for critical patients (e.g., cardiac patients).

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Described herein are techniques and systems for predicting variability of travel time for a trip. Although examples are predominantly discussed in terms of vehicular travel, and specifically driving times for traveling in an automobile (e.g., a car), it is to be appreciated that the techniques and systems disclosed herein may be applied to any form of travel that can be tracked in some way, such as non-vehicular travel (e.g., walking or running tracked via mobile or wearable computing devices), or any form of vehicular travel including, without limitation, public transit (e.g., buses, trains, etc.), air travel, marine or water travel, and so on. Furthermore, the techniques and systems disclosed herein may be suitable for implementation within any type of mapping service that involves computer-driven route planning, including, without limitation, consumer mapping services, commercial mapping services (e.g., mapping services for taxi's, public transit, etc.), emergency fleet management, vehicle fleet decision support systems (e.g., fleet scheduling software), and so on.

Example System

Figure 1:
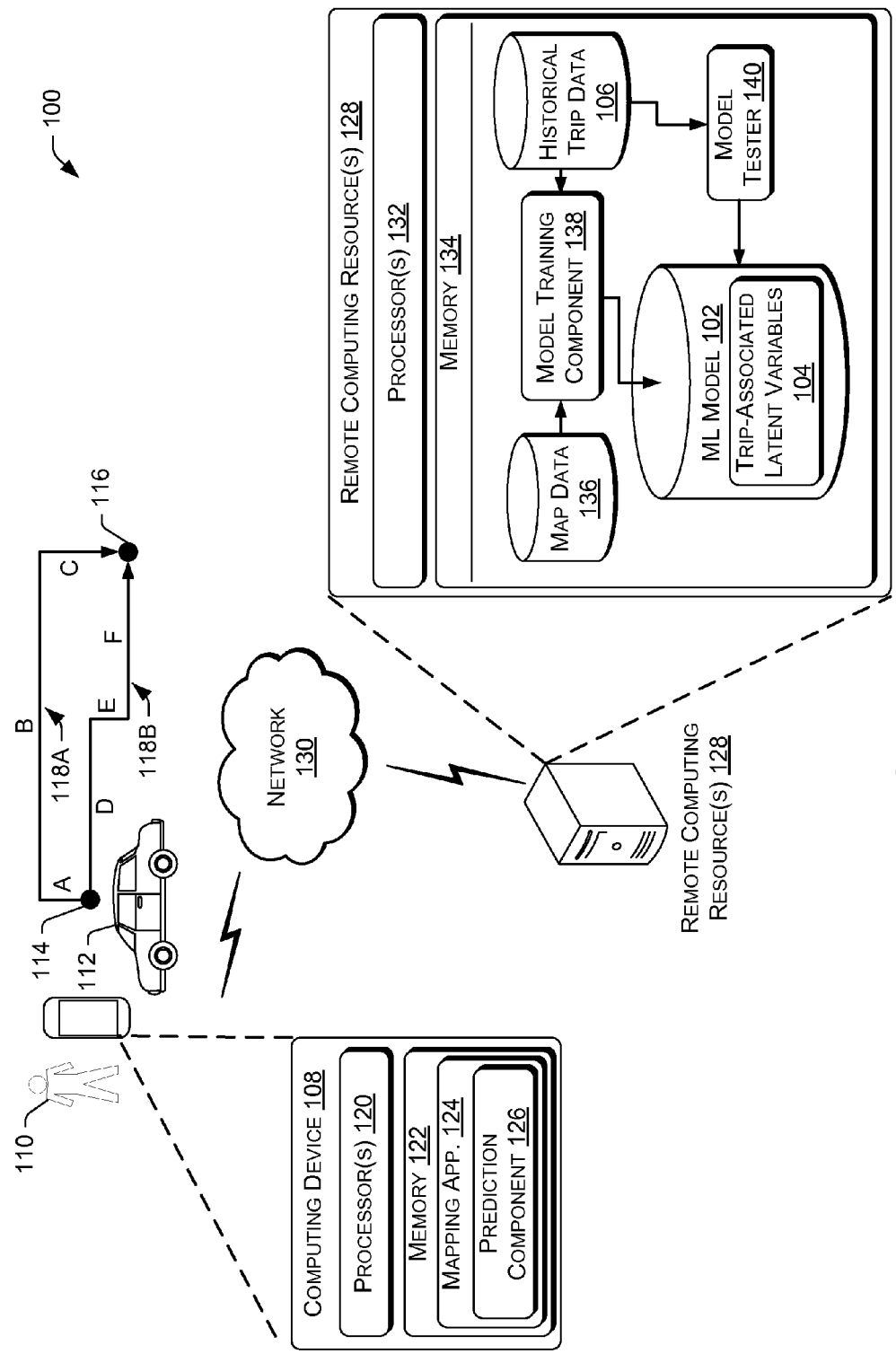
FIG. 1 is a schematic diagram of an example architecture of a computer-driven mapping system having a machine learning model that includes latent variables ("random effects") that are trip-dependent.

FIG. 1 is a schematic diagram of an example architecture 100 of a computer-driven mapping system, the architecture 100 including a machine learning model 102 that includes latent variables 104 (or "random effects 104") that are associated with a trip, which allow for solving the aforementioned "dependence problem" to provide high accuracy predictions of travel time variability. The machine learning model 102 may be trained from historical trip data 106 in order to make such predictions of travel time variability, where the variability predictions may take the form of a probability distribution of travel time. It is to be appreciated that the architecture 100 is merely one example of a suitable computer-driven mapping system, and the techniques described herein are not limited to performance using the system 100 of FIG. 1.

The system 100 may include a computing device 108 ("client device 108") that is associated with a user 110. The computing device 108 may be implemented as any type of computing device including, but not limited to, a mobile phone (e.g., a smart phone), a tablet computer, a portable digital assistant (PDA), an electronic book (e-book) reader, a portable game player, a portable media player, a game console, a set-top box (STB), a smart television (TV), a personal computer, a laptop computer, vehicle computer (e.g., navigation unit), and so forth. The user 110 may further be associated with a vehicle 112 that he uses for transportation from one location to another. It is to be appreciated that the computing device 108, although shown in FIG. 1 as being separate from the vehicle 112, may be integrated in the vehicle 112 itself as part of an in-vehicle computer, such as a navigation system.

If the user 110 desires to travel in his vehicle 112 from an origin 114 to a destination 116, the user 110 may utilize the computing device 108 in order to find the destination 116 on a map and/or plan a route to get from the origin 114 to the destination 116. FIG. 1 illustrates how, in some instances, there may be a plurality of candidate routes from the origin 114 to the destination 116, such as route 118A and route 118B. Accordingly, the computing device 108 may include one or more processors 120 and one or more forms of computer-readable memory 122 that store a mapping application 124 having a prediction component 126, among other possible modules or programs stored in the memory 122. The processor(s) 120 may be configured to execute instructions, applications, engines, or programs stored in the memory 122. In some embodiments, the processor(s) 120 may include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof.

The computing device 108 may also include additional data storage devices, such as removable storage and/or non-removable storage. Computer-readable media may include, at least, two types of computer-readable media, namely computer storage media and communication media. The memory 122, removable storage, and/or non-removable storage are all examples of computer storage media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), DVD, or other optical storage, magnetic cassettes, magnetic tape, magnetic disk storage or other magnetic storage devices, or any other non-transmission medium that may be used to store the desired information and which may be accessed by the computing device 108. Any such computer storage media may be part of computing device 108. In general, computer storage media may include computer-executable instructions that, when executed by the processor(s) 120, perform various functions and/or operations described herein.

In contrast, communication media embody computer-readable instructions, data structures, program modules, or other data in a modulated data signal, such as a carrier wave, or other transmission mechanism. As defined herein, computer storage media does not include communication media.

The computing device 108 may also include one or more input devices for interfacing with the computing device 108. Such input devices may include, without limitation, a microphone(s), a pointing device (e.g., a mouse, joystick, etc.), physical buttons, a remote control, a camera(s), a touch screen display, and/or any other suitable input device. For example, the user 110 may provide touch input to the touch screen display of the computing device 108 to specify the destination 116 for use by the mapping application 124 to plan a route(s) 118.

The mapping application 124 may utilize the information specified by the user 110 (e.g., a destination 116, start time for a trip, preferences, etc.) and any other contextual information, such as the time of day, weather conditions, traffic information, and so on, to plan routes and to predict travel time variability for those routes using the prediction component 126 that is configured to access the machine learning model 102 for making such predictions. Particularly, the computing device 108 may include one or more communication connections that allow the computing device 108 to communicate with (transmit/receive data to/from) one or more remote computing resources 128 (e.g., one or more servers) via a network 130. The network 126 may represent any one or combination of multiple different types of wired and/or wireless networks, such as cable networks, the Internet, local area networks, mobile telephone networks, wide area networks, or a combination of such networks.

With access to the machine learning model 102 over the network 130, the prediction component 126 can leverage the machine learning model 102 to make travel time variability predictions for candidate routes 118 running from the origin 114 to the destination 116 to complete a trip at a specified time (e.g., a current time, or a future start time for the trip that is specified by the user 110). One or more recommended routes 118 may be output to the user 110 via one or more output devices of the computing device 108, such as, without limitation, a display, speakers, a printer, and so on. For example, a display of the computing device 108 may provide a visual output of the recommended route(s) 118 on a map as part of the mapping application 124. In addition, a measure of driving time may be output by the mapping application 124. This measure of driving time may include, without limitation, a predicted driving time, a range of driving times, a percentile of driving time, and so on. The form of the output on the display may be text-based, graphical, or any other suitable manner of providing output on the display.

Turning to the remote computing resource(s) 128, the features of building the machine learning model 102, training (and updating/re-training) the machine learning model 102, and testing the machine learning model 102 will be discussed in further detail. In general, the remote computing resource(s) 128 that maintains the historical trip data 106 and the machine learning model 102 is shown as including one or more processors 132 and one or more forms of computer-readable memory 132, which can include any of the specified forms described above with reference to the processor(s) 120 and the computer-readable memory 122 of the computing device 108.

The memory 134 may include map data 136 comprising any suitable information regarding the geography, geographical features and/or territorial borders of an area, such as a city. Geographical features in the map data 136 may include road networks comprising major roads (e.g., highways, urban expressways, and the like). A road network database may categorize roads into different levels (e.g., level 0—highways, level 1—expressways, level 2—arterial roads) depending on the nature and primary use of the road. Other geographical features similar to roads, such as trails, paths (e.g., bike paths), and the like, may be stored as a network of segments and categorized similarly to road networks. In this sense, the map data 136 may be described herein as including data pertaining to routes within a network of segments, where multiple segments may constitute a particular route between two points of interest. Moreover, a road may comprise multiple segments or a single segment. FIG. 1 shows that the route 118A includes three segments "A, B, and C," and that the route 118A includes three segments "D, E, and F." The junctions between any two segments may represent intersections or decision points where the user 110 can choose one of multiple possible directions to proceed from that junction point.

The memory 134 may further include the aforementioned historical trip data 106 (or "mobility data 106"). The historical trip data 106 may be collected in a variety of ways, but in general may be collected from devices of users, such as the user 110, that are actually traveling about a region. This can be accomplished by collecting data reported from any suitable type of mobile computing device (e.g., a mobile phone, navigation unit of a vehicle, etc.). In some embodiments, the computing device 108 of FIG. 1 may comprise one of these mobile computing devices that reports location-based measurements and data over the network 130 as the computing device 108 (carried by the user 110) moves about a region. In some embodiments, these location-based measurements may include global positioning system (GPS) data obtained from a GPS receiver of a mobile device (e.g., a mobile phone, navigation unit, etc.), and this GPS data may include a coordinate location (e.g., latitude and longitude coordinate), a speed of the mobile device, a heading, and/or a time stamp of when the location-based measurement was taken. The location-based measurements are not limited to GPS data, however, as other types of data may be used to obtain information as to location, and/or speed, and/or time associated with a mobile device or user, and sources other than mobile computing devices may be utilized in addition, or alternatively, to the collection of data from mobile devices. For example, cellular tower data ("pings"), wireless network or access point data (e.g., WiFi devices), roadway instrumentation (e.g., sensors, cameras, etc.), or any other similar location collecting/emitting devices can be employed in connection with obtaining location-based measurements that are useful in deriving information about travel time for a particular entity. It is to be appreciated that mobile devices reporting location-based measurements do not have to be executing a mapping application (such as the mapping application 124) in order to report location-based measurements, as mobile devices may periodically report (in real-time or in batch) sequences of location-based measurements associated with the mobile device, so long as the mobile device is powered. Furthermore, any data that tracks user location may be anonymized to obscure or hide the identity of the user. Any identifying information included in the data may require user consent to obtaining that data.

Travel times (a duration measurement), and possibly other statistics, associated with the mobile devices can then be determined based upon the location-based measurements. The location-based measurements may be reported relatively frequently to give a detailed picture of travel times for any particular route within the map data 136. In some embodiments, the travel time of a mobile device on each segment of a route in the map data 136 is observed or estimated from the data collected from the mobile device. Collecting such data from a large number of mobile devices can create a large database of historical trip data 106. Moreover, a single segment in the map data 136 may be associated with multiple different driving times for different mobile devices and/or the same or different devices depending on the time of day, or the day of week that the mobile device traversed the segment. For example, commuters in urban areas readily recognize that a driving time of a road segment on a weekday during rush hour can be drastically different than a driving time of the same road segment at midnight (or during a weekend).

The historical trip data 106 can further include driving time for intersections, where time associated with an intersection may drastically differ given varying contexts. Pursuant to one example, turning left at an intersection near a shopping center during Christmas shopping season at noon can take a significantly greater amount of time when compared to turning left at the same intersection at midnight on a Tuesday. In some embodiments, the historical trip data 106 may further include additional contextual data, such as weather conditions, event data (e.g., a professional football game), and similar contextual data that can be used to identify patterns in driving time and make correlations with the additional contextual data.

Building the Machine Learning Model

The machine learning model 102 of FIG. 1 can be built using machine learning techniques in order to determine how to predict travel time variability (i.e., probability distributions of travel time) accurately from the previously observed historical trip data 106. Machine learning, as used herein, may pertain to artificial intelligence concerned with development of techniques that allow computers to "learn" predictive or explanatory models from sets of observations. The machine learning model 102 of FIG. 1 may be any suitable type of machine learning model based on supervised machine learning, semi-supervised machine learning, or unsupervised machine learning. In some embodiments, any suitable machine learning method(s) may be utilized for optimizing prediction of variability of travel time, such as a graphical or probabilistic model, neural network, support vector machine, random forest, decision tree, or other machine learning algorithm. Any suitable learning method may be utilized, such as maximum likelihood estimation, maximum a posteriori estimation, or method of moments, or nonparametric estimation. Any suitable computational method may be utilized, such as Expectation Maximization (EM), Expectation Conditional Maximization (ECM), Variational Bayes, or Monte Carlo methods.

The machine learning model 102 represents a predictive model of travel time variability that captures both the probability distribution of travel time (e.g., driving time) on the individual road segments in the map (variability at the segment level or link level), as well as the probability distribution of travel time on the entire route associated with a trip (variability at the trip level). The probability distribution is captured by the model 102 in terms of some unknown quantities that will be estimated from the historical trip data 106. The model 102 also captures the relationship of the travel times on different road segments. In particular, the model 102 includes terms (referred to herein as "latent variables" or "random effects" 104) capturing the relationship (probabilistic dependence) of travel times on the different road segments of a particular trip, which appropriately solves the "dependence problem."

The machine learning model 102 is also designed to account for the fact that some sources of variability affect the entire trip (such as the driver's habits/behavior, vehicle characteristics, etc.), while other sources of variability are localized (e.g., a delay due to a train crossing, construction, etc.). Accordingly, the latent variables 104 included in the machine learning model 102 represent unmeasured or unobserved (hidden) quantities or conditions that are associated with a trip and that affect travel time variability along the trip. The trip-associated latent variables 104 can take a variety of forms, including, but not limited to: (i) a single continuous-valued "trip effect" that captures the extent to which a particular trip is faster or slower than usual on all the road segments that make up the route 118; (ii) "autoregressive" effects that capture the fact that the travel speed tends to be similar for road segments that are close to each other in the route 118; and (iii) latent categorical variables capturing for example the level of congestion on links, the dependence of which may be modeled across links. The probability distribution of travel time on individual road segments, and the probabilistic dependence of those driving times, can depend on the time of day, the day of the week, observed traffic conditions, weather conditions, and other factors, in ways that are specified in the model 102.

To model travel time variability, the historical travel data 106 may be leveraged for the estimation of the route taken in each trip $i \in I$, meaning the sequence $R_i$ of links (or segments) traversed (so that $R_{i,k}$ is an element of the set $\mathcal{J}$ of network links for each $k \in \{1, \ldots, |R_i|\}$, the distance $d_{i,k}$ traversed for each link $R_{i,k}$ (so that $d_{i,k}$ is equal to the length of link $R_{i,k}$ for all except the first and last link of the trip), and the travel time $T_{i,k}$ on each link $R_{i,k}$. Obtaining this estimate is called "map-matching."

Having obtained the values $T_{i,k}$, the model of $T_{i,k}$ can be represented as the product of several factors, as shown in Equation (1):

$$T_{i,k} = \frac{d_{i,k}}{S_{i,k} E_i} \quad i \in \mathcal{I}, k \in \{1, \ldots, |R_i|\} \tag{1}$$

In Equation (1), $E_i$ and $S_{i,k}$ are positive-valued latent variables 104 (or "random effects 104") associated with the trip and the trip-link pair, respectively. The latent variable $E_i$ is the previously mentioned "trip effect" capturing the fact that the trip i may have, say, 10% faster speeds than average on every link in the trip. This could occur for example due to driver habits/behaviors, vehicle characteristics, and the like. The latent variable $E_i$ can take on any positive value. For example, for every trip i, there is a tendency of a driver to drive faster than usual or slower than usual on all of the road segments that make up a route 118. This unobserved quantity can be estimated in each of the historical trips in the historical trip data 106. For instance, if a particular past trip was observed in the historical trip data 106 from the origin 114 to the destination 116 at a particular time, based on the travel time of the trip, the trip effect $E_i$ can be estimated, and it may be determined that the user drove 5% faster than usual on all of the segments of the trip. This unobserved quantity can then be estimated in a similar fashion for other historical trips in the historical trip data 106. In predicting variability of travel time for future trips, the trip effect $E_i$ is considered a source of uncertainty, and the prediction component 126 integrates over this unknown quantity to predict variability of travel time for the route 118. Because this trip effect $E_i$ can take any value, it has a distribution (see Equation (2), below).

The latent variable $S_{i,k}$ represents the travel speed on the link before accounting for the trip effect $E_i$. The model of Equation (1) decomposes variability in travel time on route $R_i$ into two types: link-level variability captured by $S_{i,k}$, and trip-level variability captured by $E_i$. $E_i$ can modeled in various ways, such as a log-t distribution, gamma distribution, or nonparametric specification. One example of how $E_i$ can be modeled is as follows for unknown variance $\tau^2$:

$$\log(E_i) \sim N(0, \tau^2) \quad (2)$$

The latent variable $S_{i,k}$ captures local variability, due for example to local traffic conditions or construction on link $R_{i,k}$. $S_{i,k}$ may be modeled as a function of an unobserved discrete congestion state $Q_{i,k} \in \{1, \ldots, Q\}$ affecting the traversal of link $R_{i,k}$ in trip i. This congestion state $Q_{i,k}$ depends on the trip and is one example of the categorical latent variables described above, capturing the fact that travel speed tends to be similar for road segments that are close to each other in the route. In this manner, $Q_{i,k}$ can be different for two trips traversing the same link $R_{i,k}$ at the same time. Conditional on $Q_{i,k}$, $S_{i,k}$ may be modeled with a lognormal distribution, as follows:

$$\log(S_{i,k}) \mid Q_{i,k} \sim N(\mu_{R_{i,k},Q_{i,k}}, \sigma^2_{R_{i,k},Q_{i,k}}) \quad (3)$$

In Equation (3), $\mu_{j,q}$ and $\sigma^2_{j,q}$ for $j \in \mathcal{J}$ are unknown parameters associated with travel speed on link j under conditions $q \in \{1, \ldots, Q\}$.

Let $b(i,k) \in B$ be the time bin of the week (e.g., Monday morning rush hour) at which trip i begins traversing link $R_{i,k}$. Time bins may be defined in any suitable manner. For example, the set of time bins may include: (i) AM Rush Hour—weekdays 7-9 AM; (ii) PM Rush Hour—weekdays 3-6 PM; (iii) Nighttime—Sunday-Thursday nights 7 PM-6 AM, Friday night 8 PM-9 AM, and Saturday night 9 PM-9 AM; (iv) Weekday Daytime—remaining times during weekdays; and (v) Weekend Daytime—remaining times during weekends. A Markov model for congestion states $Q_{i,k}$ can be used as follows:

$$Pr(Q_{i,1} = q) = p^{(0)}_{R_{i,1}, b(i,1)}(q) \quad (4)$$

$$Pr(Q_{i,k} = q \mid Q_{i,k-1} = \tilde{q}) = p_{R_{i,k}, b(i,k)}(\tilde{q}, q)$$

$$k \in \{2, \ldots, |R_i|\}; q, \tilde{q} \in \{1, \ldots, Q\}$$

$p_{j,b}^{(0)}$ is an unknown probability vector for the initial congestion state for trips starting on link j during time bin $b \in B$, and $p_{j,b}$ is the transition matrix for the congestion state on link j conditional on the congestion state in the previous link of the trip, during time bin b. This model captures the fact that the tendency of the link to be congested follows a weekly cycle, with a higher congestion probability during weekday rush hours, for example. It also provides a second way to capture dependence of driving time across links (in addition to the trip effect). This specification for $Q_{i,k}$ yields a (nonstandard) Gaussian mixture model for $\log(S_{i,k})$:

$$\log(S_{i,k}) \mid Q_{i,k-1} = \tilde{q} \sim \sum_{q \in Q} p_{R_{i,k}, b(i,k)}(\tilde{q}, q) N(\mu_{R_{i,k},q}, \sigma^2_{R_{i,k},q})$$

$$k \in \{2, \ldots, |R_i|\}.$$

This mixture model is nonstandard both because $S_{i,k}$ is not directly observed, and because of the Markov model on the congestion states $Q_{i,k}$. In order to have statistical identifiability, and to enforce the interpretation of the mixture components q as increasing levels of congestion, a restriction $\mu_{j,q-1} \leq \mu_{j,q}$ can be placed for each $j \in \mathcal{J}$ and $q \in \{2, \ldots, Q\}$.

The statistical model represented by Equations (1)-(4) is flexible enough to capture a wide range of behaviors. However, not all network links $j \in \mathcal{J}$ will have sufficient data (in terms of number of link traversals i, k with $R_{i,k}=j$) to accurately estimate the link-specific parameters $\mu_{j,q}$, $\sigma^2_{j,q}$, $p_{j,b}^{(0)}$, and $p_{j,b}$. For links j that have very little data, a single set of parameters within each road category $c(j) \in \mathcal{C}$ can be used, the road category comprising the combination of road class (e.g., "highway", "arterial", or "street") and speed limit. For each j let $n_j = |\{i \in I, k \in \{1, \ldots, |R_i|\}: j = R_{i,k}\}|$ be the number of traversals of link j. Defining a minimum number m of traversals, for links with $n_j \leq m$, Equation (5) may be specified as follows:

$$\mu_{j,q} = \mu_{c(j),q}, \sigma^2_{j,q} = \sigma^2_{c(j),q}, p_{j,b} = p_{c(j),b}, p_{j,b}^{(0)} = p_{c(j),b}^{(0)}$$

$$\text{for } q \in \{1, \ldots, Q\}, b \in B, j \in \mathcal{J} : n_j < m \quad (5)$$

Here, $\mu_{c,q}$, $\sigma^2_{c,q}$, $p_{j,c}^{(0)}$, and $p_{j,c}$ for $c \in \mathcal{C}$ are parameters associated with the road category c.

The machine learning model 102 incorporates both trip-level variability (e.g., driver effects), and link-level variability due, for example, to construction or speed differences between lanes. Combined with the assumption that vehicles stay at constant speed while traversing a link (or follow a specific speed profile across the link), it provides a realistic model for the location of the vehicle at all times during the trip. For this reason, the machine learning model 102 can be used to give enroute predictions of the remaining travel time of the route while traversing that route. The machine learning model 102 also captures the effect of weekly cycles, speed limit, and road class, which are believed to be strongly associated with driving speed.

Although particular examples of trip-associated latent variables 104 are provided herein, it is to be appreciated that the machine learning model 102 can incorporate additional latent variables 104 to those described herein. In general, any suitable type of latent variable 104 associated with the trip that models dependence of driving time across the segments/links of the trip may be utilized in the model 102 without changing the basic characteristics of the system.

Training the Machine Learning Model

After building the machine learning model 102, a model training component 138 may use the historical trip data 106 to train the machine learning model 102 to make accurate predictions of travel time variability. In particular, unknown quantities specifying the probability distribution of travel time on individual road segments, the probabilistic dependence of those driving times to each other, and the effect of additional factors like time of day, are learned from the historical trip data 106. In some embodiments, the model training component 138 trains the machine learning model 102 for every geographic region of interest, such as particular municipalities or even continents. In this sense, the machine learning model 102 may be region-specific. For each such region, a subset of the historical trip data 106, typically a set of the most recently collected data, is not used in the learning process and is instead reserved for use in evaluating the quality of the predictions.

The training/learning process may be done in a variety of ways. One suitable approach that is computationally efficient is based on maximum a posteriori (MAP) estimation. For a parametric machine learning model 102, this may involve obtaining approximate MAP estimates of the parameters. An Expectation Conditional Maximization (ECM) approach may be used for obtaining MAP estimates during training ECM is closely related to Expectation Maximization (EM), but allows for closed-form updates in situations where the parameter vector can be partitioned into subvectors, each of which would have a closed form EM update if the remaining parameters were known.

For notational simplicity, the use of common parameters in Equation (5) can be dropped; the extension to handle these is straightforward. Now consider the observed data to consist of the transformed values $\{\log \tilde{S}_{i,k}\}_{i \in I, k \in \{1, \ldots, |R_i|\}}$ where $\log \tilde{S}_{i,k} \equiv \log d_{i,k} - \log T_{i,k}$ is the log average speed during link traversal i, k. To estimate the unknown quantities of interest $\theta = (\{\mu_{j,q}, \sigma_{j,q}^2\}_{j \in J, q \in \{1,\ldots,Q\}}, \{p_{j,c}^{(0)}, p_{j,b}\}_{j \in J, b \in B}, \{\log E_i\}_{i \in I}, \tau^2)$, the maximum a posteriori (MAP) estimator may be used under the (nonintegrable) prior distribution $\pi(\tau, \{\mu_{j,q}, \sigma_{j,q}\}_{j,q}, \{p_{j,b}^{(0)}, p_{j,b}\}_{j,b}) \propto 1$ that is uniform on the support of the parameter space. Such uniform priors on unbounded parameter spaces are commonly used in situations where there is little or no prior information regarding the parameter values. Obtaining the MAP estimator under this uniform prior also corresponds to maximizing the product of the density of the observed data, times the density of the following random effects 104 over $\theta$:

$$f(\{\log \tilde{S}_{i,k}\}_{i,k}|\theta) f(\{\log E_i\}_{i \in \tau}|\tau^2) \qquad (6)$$

The congestion states $Q_{i,k}$ do not appear in the parameter vector $\theta$, or in the Expression (6); the congestion states $Q_{i,k}$ may be viewed as missing data (in the terminology of EM), and the expression $f(\{\log \tilde{S}_{i,k}\}_{i,k}|\theta)$ is an integral over these missing data. For this reason, it is nontrivial to maximize the objective of Expression (6), motivating the use of ECM.

Although EM and ECM are commonly applied to obtain a (local) maximizer of the likelihood function, they can also be used to obtain a (local) maximizer of the posterior density. For EM, this may be done by maximizing the expectation of the complete-data log-likelihood plus the log prior density in each iteration, instead of just the complete-data log-likelihood. For ECM, this operation may be done for each parameter sub-vector, conditional on the remaining parameters.

ECM may be applied by partitioning the parameter vector into the three sub-vectors $\theta_1 = (\{\mu_{j,q}, \sigma_{j,q}^2, p_{j,b}^{(0)}, p_{j,b}\}_{j,q,b})$, $\theta_2 = (\{\log E_i\}_{i \in I})$, and $\theta_3 = \tau^2$. First, the update equations for $\theta_2$ conditional on $\theta_{[-2]} \equiv (\theta_1, \theta_3)$ may be derived. Using the terminology of EM, the missing data in the model represented by Equations (1)-(4) are $$\{Q_{i,k}\}_{i \in I, k \in \{1, \ldots, |R_i|\}},$$

and the complete data log-likelihood is:

$$\log f(\{Q_{i,k}, \log \tilde{S}_{i,k}\}_{i \in I, k \in \{1, \ldots, |R_i|\}} | \theta) = \qquad (7)$$

$$\sum_{i \in I} \sum_{q \in Q} [1_{\{Q_{i,1} = q\}} \log(p_{R_{i,1}, b(i,1)}^{(0)}(q))] +$$

$$\sum_{i \in I, k \in \{2, \ldots, |R_i|\}} \sum_{\tilde{q}, q \in Q} [1_{\{Q_{i,k-1} = \tilde{q}, Q_{i,k} = q\}} \log(p_{R_{i,k}, b(i,k)}(\tilde{q}, q))] +$$

$$\sum_{i \in I, k \in \{1, \ldots, |R_i|\}} \left[ -\frac{\log \sigma^2_{R_{i,k}, Q_{i,k}}}{2} - \frac{(\log \tilde{S}_{i,k} - \log E_i - \mu_{R_{i,k}, Q_{i,k}})^2}{2\sigma_{R_{i,k} Q_{i,k}}} \right]$$

In Expression (7), only the final term depends on $\{\log E_i\}_{i \in I}$, so the remaining terms can be ignored during the update of $\theta_2$. Additionally, because Expression (6) is maximized, the relevant terms from the log of the random effect density for $\{\log E_i\}_{i \in I}$ may be added in to yield:

$$\sum_{i \in I} -\frac{(\log E_i)^2}{2\tau^2} - \sum_{i \in I, k \in \{1, \ldots, |R_i|\}} \left[ \frac{(\log \tilde{S}_{i,k} - \log E_i - \mu_{R_{i,k}, Q_{i,k}})^2}{2\sigma^2_{R_{i,k}, Q_{i,k}}} \right] \qquad (8)$$

The expectation of Expression (8) may be taken with respect to the distribution $$f(\{Q_{i,k}\}_{i \in I, k \in \{1, \ldots, |R_i|\}} | \{\log \tilde{S}_{i,k}\}_{i \in I, k \in \{1, \ldots, |R_i|\}}, \hat{\theta})$$

of the missing data conditional on the observed data and the current parameter estimates $\hat{\theta}$. Since Expression (8) is a sum over terms that involve at most one of the $Q_{i,k}$ values, this expectation is a function of only $$\phi_{\tilde{i}, \tilde{k}}(q) \equiv Pr(Q_{\tilde{i}, \tilde{k}} = q | \{\log \tilde{S}_{i,k}\}_{i \in I, k \in \{1, \ldots, |R_i|\}}, \hat{\theta})$$

for each $\tilde{i} \in I$ and $\tilde{k} \in \{1, \ldots, |R_i|\}$. Since a Markov model may be used (see Equation (4)) for the $\{Q_{i,k}\}, \phi_{\tilde{i}, \tilde{k}}(q)$ can be calculated for each $\tilde{i}$ and $\tilde{k}$ using the forward-backward algorithm for hidden Markov models.

Since an update of $\theta_2$ conditional on $\theta_{[-2]} = \hat{\theta}_{[-2]}$ is performed, $\theta_2$ can be treated as an unknown parameter and $\hat{\theta}_{[-2]}$ as known. Focusing on particular terms in Expression (8) yields the following:

$$E\left[\frac{(\log E_i)(2\log \tilde{S}_{i,k} - \log E_i)}{2\hat{\sigma}^2_{R_{i,k},Q_{i,k}}} \middle| \{\log \tilde{S}_{i,j}\}_{i\in I, k\in\{1,\ldots,|R_i|\}}, \hat{\theta}\right] =$$

$$\frac{(\log E_i)(2\log \tilde{S}_{i,k} - \log E_i)}{2}\left[\sum_{q=1}^{Q} \frac{\phi_{i,k}(q)}{\hat{\sigma}^2_{R_{i,k},q}}\right]$$

$$E\left[\frac{(\log E_i)(-\hat{\mu}_{R_{i,k},Q_{i,k}})}{\hat{\sigma}^2_{R_{i,k},Q_{i,k}}} \middle| \{\log \tilde{S}_{i,k}\}_{i\in I, k\in\{1,\ldots,|R_i|\}}, \hat{\theta}\right] =$$

$$-(\log E_i)\left[\sum_{q=1}^{Q} \frac{\phi_{i,k}(q)\hat{\mu}_{R_{i,k},q}}{\hat{\sigma}^2_{R_{i,k},q}}\right]$$

To maximize the expectation of Expression (8), for each $i \in I$, the following can be maximized over $\log E_i$, where $$a_{i,k} \sum_{q=1}^{Q} \frac{\phi_{i,k}(q)}{\hat{\sigma}^2_{R_{i,k},q}} \text{ and}$$

$$d_{i,k} \sum_{q=1}^{Q} \frac{\phi_{i,k}(q)\hat{\mu}_{R_{i,k},q}}{\hat{\sigma}^2_{R_{i,k},q}}:$$

$$(\log E_i)^2\left[-\frac{1}{2\tau^2} - \frac{\sum_{k\in\{1,\ldots,|R_i|\}} a_{i,k}}{2}\right] +$$

$$(\log E_i)\sum_{k\in\{1,\ldots,|R_i|\}}[a_{i,k}\log \tilde{S}_{i,k} - d_{i,k}]$$

This yields the updated estimate:

$$\log \hat{E}_i^{new} = \frac{\sum_{k\in\{1,\ldots,|R_i|\}}(a_{i,k}\log \tilde{S}_{i,k} - d_{i,k})}{1/\tau^2 + \sum_{k\in\{1,\ldots,|R_i|\}} a_{i,k}}.$$

In the special case where the $\hat{\sigma}_{j,q}^2$ are equal for all $j$ and $q$, for example, $\log \hat{E}_i^{new}$ is approximately the average across $k \in \{1, \ldots, |R_i|\}$ of the difference between $\log \tilde{S}_{i,k}$ and its expectation under the model, which is a reasonable estimator for the trip effect latent variable 104. The computation of $\log \hat{E}_i^{new}$ can be done in parallel across $i \in I$, after calculating $\phi_{i,k}(q)$ in parallel across $i$ and $k$.

The update of $\theta_1$ conditional on $\theta_{[-1]}$ is a nonstandard EM update of the parameters of a Gaussian mixture model for each $j \Sigma \mathcal{J}$. To derive this, note that all of the terms in the Expression (7) are functions of $\theta_1$ and so are relevant for this update. First, the expectations of these terms can be taken, keeping in mind that since an update of $\theta_1$ conditional on $\theta_{[-1]} = \hat{\theta}_{[-1]}$ is performed, $\theta_1$ can be treated as an unknown parameter and $\hat{\theta}_{[-1]}$ as a known constant. Also defining $$\psi_{i,\bar{k}}(\tilde{q}, q) \equiv Pr(Q_{i,\bar{k}-1} = \tilde{q}, Q_{i,\bar{k}} = q \mid \{\log \tilde{S}_{i,k}\}_{i\in I, k\in\{1,\ldots,|R_i|\}}, \hat{\theta})$$

for each $\tilde{i} \in I$ and $\bar{k} \in \{2, \ldots, |R_i|\}$ (another quantity that can be calculated using the forward-backward algorithm), the following may be obtained:

$$E\left[\mathbf{1}_{\{Q_{i,1}=q\}}\log(p^{(0)}_{R_{i,1},b(i,1)}(q)) \middle| \{\log \tilde{S}_{i,k}\}_{i\in I, k\in\{1,\ldots,|R_i|\}}, \hat{\theta}\right] =$$

$$\phi_{i,1}(q)\log(p^{(0)}_{R_{i,1},b(i,1)}(q))$$

$$E\left[\mathbf{1}_{\{Q_{i,\bar{k}-1}=\tilde{q},Q_{i,\bar{k}}=q\}}\log(p_{R_{i,\bar{k}},b(i,\bar{k})}(\tilde{q},q)) \middle| \{\log \tilde{S}_{i,k}\}_{i\in I, k\in\{1,\ldots,|R_i|\}}, \hat{\theta}\right] =$$

$$\psi_{i,\bar{k}}(\tilde{q},q)\log(p_{R_{i,\bar{k}},b(i,\bar{k})}(\tilde{q},q))$$

$$E\left[-\frac{1}{2}\log \sigma^2_{R_{i,k},Q_{i,k}} \middle| \{\log \tilde{S}_{i,k}\}_{i\in I, k\in\{1,\ldots,|R_i|\}}, \hat{\theta}\right] = -\sum_{q=1}^{Q}\frac{\phi_{i,k}(q)}{2}\log \sigma^2_{R_{i,k},q}$$

$$E\left[\frac{(\log \hat{E}_i)(2\log \tilde{S}_{i,k} - \log \hat{E}_i)}{2\sigma^2_{R_{i,k},Q_{i,k}}} \middle| \{\log \tilde{S}_{i,k}\}_{i\in I, k\in\{1,\ldots,|R_i|\}}, \hat{\theta}\right] =$$

$$(\log \hat{E}_i)(2\log \tilde{S}_{i,k} - \log \hat{E}_i)\left[\sum_{q=1}^{Q}\frac{\phi_{i,k}(q)}{2\sigma^2_{R_{i,k},q}}\right]$$

$$E\left[\frac{(\log \hat{E}_i)(-\mu_{R_{i,k},Q_{i,k}})}{\sigma^2_{R_{i,k},Q_{i,k}}} \middle| \{\log \tilde{T}_{i,j}\}_{i\in I, j\in A_i}, \hat{\theta}\right] =$$

$$-(\log \hat{E}_i)\left[\sum_{q=1}^{Q}\frac{\phi_{i,k}(q)\mu_{R_{i,k},q}}{2\sigma^2_{R_{i,k},q}}\right]$$

$$E\left[\frac{-(\log \tilde{S}_{i,k})^2}{2\sigma^2_{R_{i,k},Q_{i,k}}} \middle| \{\log \tilde{S}_{i,k}\}_{i\in I, k\in\{1,\ldots,|R_i|\}}, \hat{\theta}\right] =$$

$$(-(\log \tilde{S}_{i,k})^2)\left[\sum_{q=1}^{Q}\frac{\phi_{i,k}(q)}{2\sigma^2_{R_{i,k},q}}\right]$$

$$E\left[\frac{-(\mu_{R_{i,k},Q_{i,k}})^2}{2\sigma^2_{R_{i,k},Q_{i,k}}} \middle| \{\log \tilde{S}_{i,k}\}_{i\in I, k\in\{1,\ldots,|R_i|\}}, \hat{\theta}\right] = -\left[\sum_{q=1}^{Q}\frac{\phi_{i,k}(q)(\mu_{R_{i,k},q})^2}{2\sigma^2_{R_{i,k},q}}\right]$$

The first term above is the only one that involves the $p_{j,b}^{(0)}(q)$. Thus, in order to obtain the update expression for $p_{j,b}^{(0)}(q)$, the following may be maximized:

$$\sum_{i: R_{i,1}=j, b(i,1)=b} \phi_{i,1}(q)\log(p^{(0)}_{j,b}(q)).$$

This yields the following update:

$$\hat{p}^{(0),new}_{j,b}(q) = \left(\sum_{i:\, R_{i,1}=j, b(i,1)=b} \phi_{i,1}(q)\right) \bigg/ \left(\sum_{i:\, R_{i,1}=j, b(i,1)=b} 1\right),$$

That is, the above expression yields the average of the allocation probabilities $\phi_{i,1}(q)$ for all trips $i$ that traverse link $j$ first, during time bin $b$. Analogously, the update for $p_{j,b}(\tilde{q},q)$ is:

$$\hat{p}^{new}_{j,b}(\tilde{q},q) = \left(\sum_{i,k:\, R_{i,k}=j, b(i,k)=b, k>i} \psi_{i,k}(\tilde{q},q)\right) \bigg/ \left(\sum_{i,k:\, R_{i,k}=j, b(i,k)=b, k>i} \phi_{i,k-1}(\tilde{q})\right).$$

Standard calculations for EM in Gaussian mixture models show that the updates for $\mu_{j,q}$ and $\sigma_{j,q}^2$ are:

$$\hat{\mu}_{j,q}^{new} = \frac{\sum_{i,k:\, R_{i,k}=j} \phi_{i,k}(q)(\log \tilde{S}_{i,k} - \log \hat{E}_i)}{\sum_{i,k:\, R_{i,k}=j} \phi_{i,k}(q)}$$

$$\hat{\sigma}_{j,q}^{2,new} = \frac{\sum_{i,k:\, R_{i,k}=j} \phi_{i,k}(q)(\log \tilde{S}_{i,k} - \log \hat{E}_i - \hat{\mu}_{j,q})^2}{\sum_{i,k:\, R_{i,k}=j} \phi_{i,k}(q)}$$

Similarly, the update for $\theta_3 = \tau^2$ conditional on $\theta_{[-3]} = \hat{\theta}_{[-3]}$ is:

$$\hat{\tau}^{2,new} = \frac{1}{|I|} \sum_{i \in I} (\log \hat{E}_i)^2.$$

Training the machine learning model 102, as described herein, can facilitate the identification of patterns, trends, and so on, within the historical trip data 106 in order to estimate the latent variables 104, among other variables in the model 102.

In some embodiments, the model training component 138 may update or re-train the machine learning model 102 with newly received historical trip data 106. The updating may be performed periodically (e.g., once a day, once a week, etc.), or the updating may occur upon a trigger, such as a user-initiated instruction, or upon receiving a threshold amount of new historical trip data 106 since the last training or update occurred, and the like.

Referring again to FIG. 1, the computer-readable memory 134 may further include a model tester 140 that is configured to test or check the model 102 after it has been fully specified and trained to make sure the system is working as desired. For example, the machine learning model 102 may be trained in a particular context such that it doesn't work very well for predicting travel time variability in a new and different context. Testing of the model 102 may be accomplished by applying the trained machine learning model 102 to a portion of the historical trip data 106 (called the "test data") to perform prediction of travel time variability for individual trips in the test data. That is, a portion of the historical trip data 106 may be used to train the model 102, while a remainder or another portion of the historical trip data 106 (called the test data) may be reserved (i.e., not used for training the model 102) for testing the model 102, and for each trip in the test data, the predicted probability distribution of travel time may be obtained from the machine learning model 102. This prediction may be compared to the observed travel time for the trip, and the quality of the predictions is evaluated based on the comparison of the prediction to the actual observed travel time. In this manner, the accuracy of the model 102 in predicting variability in travel time may be evaluated, and based on the results of the testing, steps may be taken to improve the performance of the machine learning model 102. This may involve re-building or modifying the model 102 itself, or by re-training the model 102 with updated historical trip data 106.

The model tester 140 may measure accuracy or quality of the machine learning model 102 for predicting variability in travel time in various ways. For example, a set of numerical measures and/or graphical summaries may be generated by the model tester 140 for assessing the performance of the machine learning model 102. The numerical measures and/or graphical summaries may include, without limitation, an average difference between a predicted average driving time and the observed driving time of the trip, numerical measures of the quality of a predictive interval for driving time obtained using the probability distribution, or numerical and graphical measures of the quality of the predictive probability distribution, and so on. At least one type of numerical measure for evaluating performance of the machine learning model 102 in predicting travel time variability is a measure of accuracy of a 95% interval prediction of travel time as obtained from the model 102. An interval prediction may be obtained by taking lower and upper bounds of the interval to be different quantiles of the predicted travel time distribution (for example, the 95% interval can be obtained as the 0.25 and 0.975 quantiles, or the 0 and 0.95 quantiles). Another type of numerical measure is a measure of accuracy of a point ("best" single) prediction of travel time as obtained from the model. To obtain a point prediction, a geometric mean of the predicted travel time distribution may be used, as approximated by Monte Carlo. Alternatively, the median of the predicted travel time distribution, or the arithmetic mean of the predicted travel time distribution may be used to obtain a point prediction.

The model tester 140 may test the model 102 periodically (e.g., weekly, monthly, etc.) to check that the predictions are still accurate for a given region. In other embodiments, testing of the model 102 may occur upon a trigger, such as a user-initiated instruction, or upon receiving a threshold amount of new historical trip data 106 since the last training or update occurred, and the like.

Prediction

In FIG. 1, the prediction component 126 of a mapping application 124, when executing on the computing device 108, may utilize the trained machine learning model 102 in connection with predicting a probability distribution of travel time for individual routes 118 corresponding to a trip from an origin 114 to a destination 116 at a specified time. The prediction of the probability distribution of travel time may represent an inference from a set of observations. The set of observations may include information obtained via user input to the computing device 108, such as a received destination, and perhaps a specified future start time associated with a trip. Other observations may be obtained from sensors of the computing device 108 and/or remote resources over the network 130, such as a current time (time of day and date), a current position or location of the computing device 108, and other contextual data, such as weather conditions, traffic conditions, and the like, which may be obtained from remote resources over the network 130. The prediction is probabilistic in that it computes, for a random variable of travel time, a probability distribution for the random variable. In some embodiments, the probability distribution that is calculated by the prediction component 126 includes the variance, the interquartile range, and/or predictive intervals.

When training the model 102, the time bin b(i,k) is known for every i and k. However, when doing prediction, only the time b(i,1) associated with the first link $R_{i,1}$ in the trip is known. When doing prediction, the time t(i,k) at which the trip i begins traversing each link $R_{i,k}$ can be estimated, and then b(i,k) can be estimated to be the time bin into which t(i,k) falls. To estimate t(i,k) for each $k \in \{2, \ldots, |R_i|\}$, the known start time t(i,1) of the trip may be used, plus the predicted average (geometric mean) time required to traverse the route up to link $R_{i,k}$:

$$\hat{t}(i, k) = t(i, 1) + \text{Geometric Mean}\left(\sum_{\tilde{k}=1}^{k-1} T_{i,\tilde{k}}\right) \quad k \in \{2, \ldots, |R_i|\}.$$

This quantity is not available in closed form. We estimate it using Monte Carlo.

It is to be appreciated that, although FIG. 1 shows the specific implementation of the computing device 108 in communication with the remote computing resource(s) 128 via a network 130, the architecture 100 is not so limited. For example, the network 130 may be omitted, in some embodiments, and the various components and devices of FIG. 1 may be implemented as a single, integrated device, without a network 130 per se, such as a high performance computing system usable as a client computing device to maintain the model 102 and also perform predictions of travel time variability. The prediction component 126 may be resident on the remote computing resource(s) 128 in what may amount to more of a thin-client implementation of the system.

Figure 2:
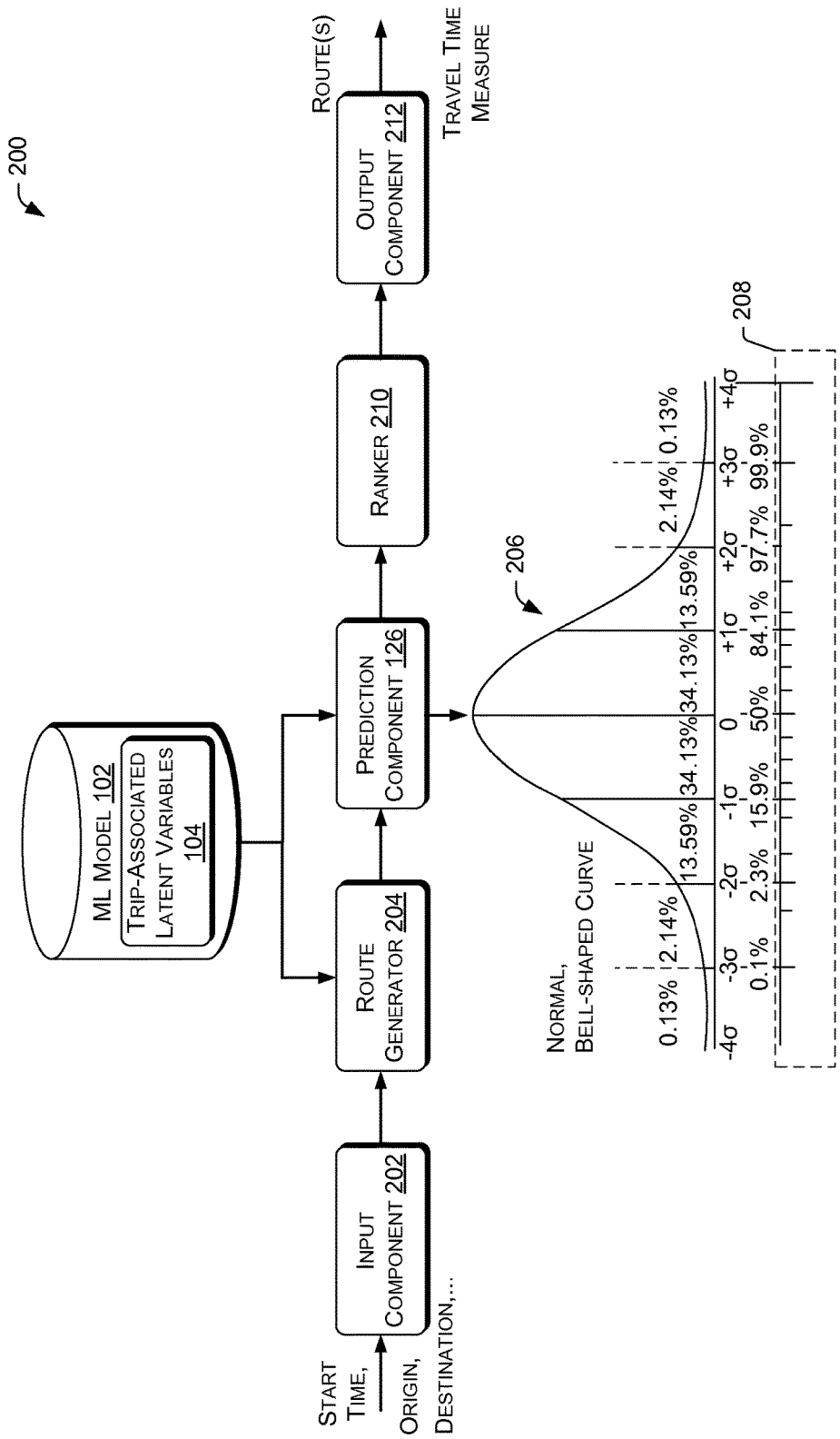
FIG. 2 is a schematic diagram of a system for predicting variability of travel time.

FIG. 2 is a schematic diagram of a system 200 for predicting variability of travel time and outputting route recommendations and/or measures of driving time based on the variability prediction. The system 200 may be implemented as part of a mapping service that includes a mapping application configured to execute on the computing device 108 of FIG. 1. The system 200 may include the prediction component 126 and the machine learning model 102 that includes the latent variables 104 (or "random effects 104" associated with a trip. In the scenario of FIG. 2, the machine learning model 102 has been trained by the model training component 138 of FIG. 1.

The system 200 may include an input component 202 that is configured to receive input in the form of at least an origin 114, a destination 116, and a start time (e.g., a current time or future time) associated with a trip. Some of the input may be received via user input at the computing device 108, such as the user 110 inputting the destination 116 when executing the mapping application 124. Other input may be obtained by the computing device 108 via sensors on-board the computing device 108 or via the network 130 from remote resources. In some embodiments, the input may include additional contextual data, such as weather conditions, traffic conditions, road conditions, etc.

The system 200 may further include a route generator 204 that is configured to obtain a set of candidate routes 118 that run from the origin 114 to the destination 116. In some embodiments, the candidate routes 118 that are obtained by the route generator 204 may be based on average driving time associated with the individual candidate routes 118. Data on the average driving time for individual routes 118 may be obtained from the machine learning model 102, or from other sources. In some embodiments, the candidate routes 118 that are obtained by the route generator 204 may be based on other data, such as the start time (which may include both the time of day and the day of the week (e.g., the date)), the existence (and possibly amount of) toll booths that are located along the individual routes 118, and other similar data associated with the routes.

A set of candidate routes 118 generated by the route generator 204 can be relatively large. For example, the set of candidate routes 118 may be on the order of several hundreds of routes 118 or more. Despite the potentially large number of candidate routes 118 obtained by the route generator 204, it is relatively efficient, computationally, to obtain a large set of candidate routes 118 using a metric such as average driving time associated with the individual routes 118.

Given the set of candidate routes 118 from the route generator 204, the prediction component 126 may predict, based at least in part on the machine learning model 102 that includes the latent variables 104 associated with the trip, a probability distribution 206 of travel time for individual ones of the candidate routes 118. FIG. 2 illustrates an example probability distribution 206 in the form of a normal (or Gaussian) distribution, although the probability distribution 206 determined by the prediction component 126 is not so limited. In particular, the probability distribution implied by the model described herein may be used.

FIG. 2 also illustrates that the probability distribution 206 may include percentiles 208 of travel time. For example, the predicted probability distribution 206 for a given route 118A may specify that the $70^{th}$ percentile of travel time (e.g., driving time) for route 118A is 12 minutes. The predicted probability distribution 206 for a different route 118B may specify the $70^{th}$ percentile of travel time for route 118B as 10 minutes. It is to be appreciated that a wealth of information useful to route planning applications may be gleaned from the probability distribution 206 in addition to percentiles 208. Furthermore, due to the latent variables 104 that are associated with the trip, in that they capture the relationship between travel times on individual roads segments of a candidate route 118 for the trip, the prediction of travel time variability (the probability distribution 206) made by the prediction component 126 will provide a high accuracy prediction that can improve customer experience with respect to mapping services and applications 124. In this manner, the probability distribution predictions may be used for route recommendation and travel time reporting in mapping service output.

Accordingly, the system 200 may further include a ranker 210 that is configured to rank the candidate routes 118 obtained by the route generator 204 according to a criterion that is based at least in part on the travel time variability prediction (i.e., the probability distribution 206 of travel time) for individual ones of the candidate routes 118. That is, the criterion may be used to evaluate, rank, and select routes from among the set of candidate routes 118. For example, the candidate routes 118 can be ranked according to a specified percentile of travel time, such as the 70th or 80th percentile of travel time. The choice of percentile 208 controls how conservative the route selection. For example, in particularly risk-averse applications such as fleets of refrigerated trucks or concrete delivery, a higher percentile can be used. Another possible ranking criterion is the probability that a vehicle will arrive at the destination 116 before a specified time. If route selection is based on minimizing the criterion, the ranking may go from lowest to highest values of a percentile 208 of travel time, for example, the lowest value among all the routes 118 in the candidate set being ranked the highest. The route or routes 118 with the best ranking (for example, lowest value of the $70^{th}$ percentile of driving time, or highest probability of arriving within 30 minutes) may be recommended by an output component 212 to a user 110.

In some embodiments, route ranking and selection may be based on additional criteria, such as minimizing the predicted average driving time, minimizing another route criterion that incorporates predicted average driving time along with other measures of route desirability, such as whether the route has tolls, and so on.

In some embodiments, the criterion for route ranking and selection may be based on a user specification of his risk tolerance. For instance, the mapping application 124 may provide a user interface with an interactive tool allowing the user 110 to control how conservative of a prediction they desire, and/or how conservative of a prediction they desire in the route selection. For example, the user interface can have a sliding bar where the user 110 shifts the bar to specify how much worse or better it is for them to arrive late by 10 minutes than to arrive early by 10 minutes. In other examples, the interactive tool may provide multiple choice options or similar selection mechanisms to allow the user 110 to specify a level of risk-aversion (or risk-tolerance). The mapping application 124 (via the ranker 210) can translate this measure into a percentile 208 used for the route selection criterion and/or the reported travel time criterion. That is, the criterion for route selection and travel time reporting may be adjusted pursuant to the risk-tolerance specified by the user 110. In this manner, the output component 212, if providing a single measure/value of travel time as output, may provide the $80^{th}$ percentile of travel time as output to a more risk-averse person (meaning that the risk-averse user would only be late 20% of the time if they relied on that prediction), while providing the $60^{th}$ percentile of travel time to a more risk-tolerant person (meaning that the risk-tolerant user would be late 40% of the time if they relied on that prediction). Route recommendation may operate in a similar fashion to recommend routes based on the level of risk the user 110 is willing to take on.

The output component 212 may provide any suitable type of output that is based at least in part on the predicted probability distribution 206. For example, one or more routes 118 may be recommended to the user 110 that satisfy or minimize the criterion. For each recommended route 118, the output may further include some measure of travel time for the respective route 118 that can be based on the predicted probability distribution 206 of travel time. For example, the measure of travel time may include a single predicted travel time (e.g., a specific percentile 208 of travel time) that summarizes the variability in travel time. In some embodiments, the output component 212 may reveal to the user 110 via an output component of the computing device 108 the actual percentile of travel time that it is providing. In other embodiments, the output component 212 may give a simpler graphical or numerical display of the same concept.

In addition, or alternatively, to providing a single predicted travel time to the user 110, the output component 212 may provide a measure of the variability of travel time on the recommended routes. One approach is to provide the user with a lower bound and upper bound on (a range of) the likely travel time (for example, "the driving time is predicted to be between 45 and 55 minutes"). These lower and upper bounds can be obtained from the predicted distribution 206 using a variety of interval estimation methods. In some embodiments, an interval that contains 95% (or 90%, or 99%, etc.) of the predicted travel time distribution 206 by using the 2.5 and 97.5 percentiles of that distribution 206 may be obtained. Again, how conservative these lower and upper bounds are can be controlled by using an interval with a higher or lower probability; a 99% interval is correct (the actual driving time falls between the lower and upper bounds) about 99% of the time, and a 90% interval is correct about 90% of the time.

Figure 3:
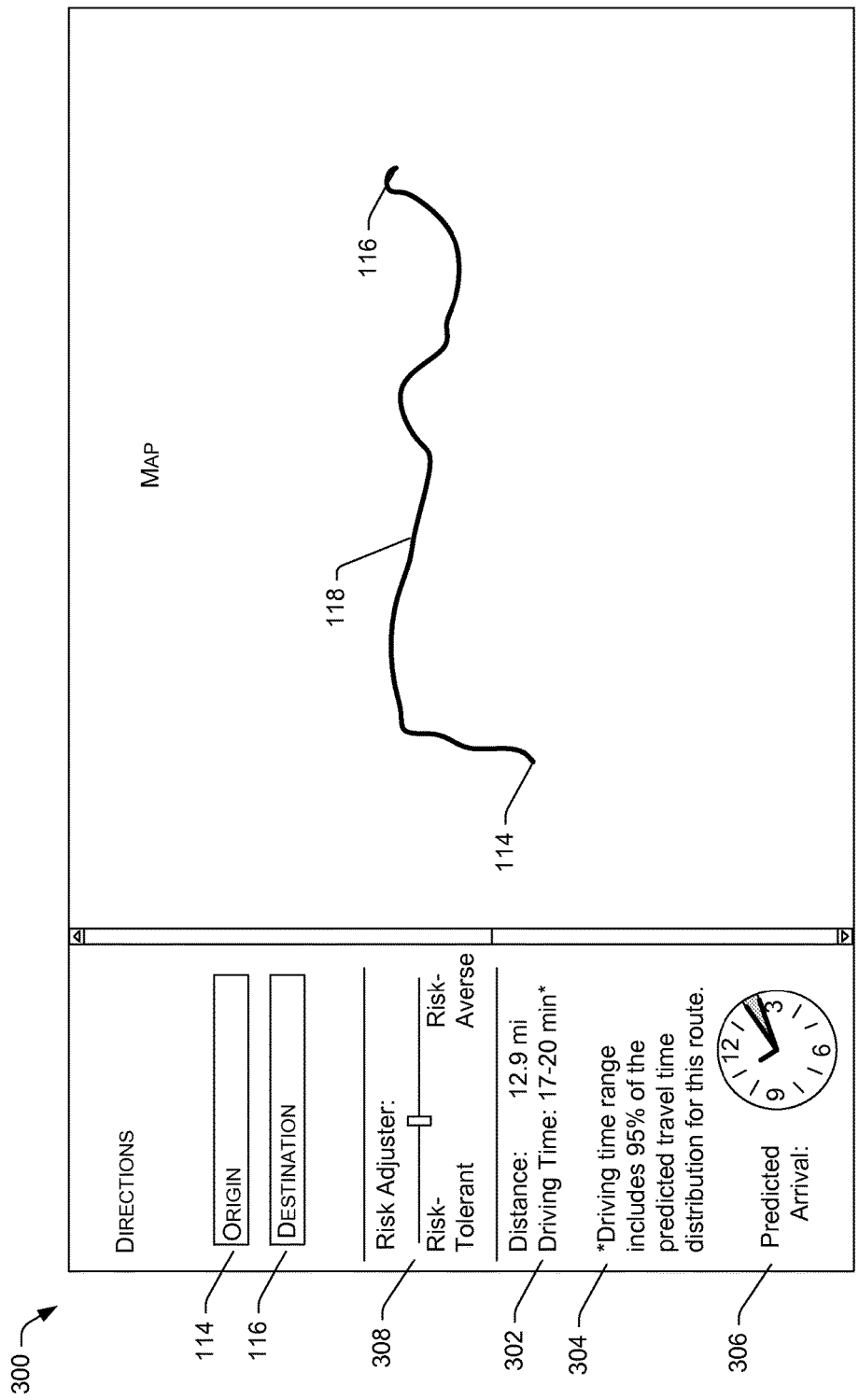
FIG. 3 is a screen rendering of an example graphical user interface for providing mapping service output on a display based on travel time variability prediction.

Another approach to illustrate to the user 110 the variability of travel time on a recommended route 118 is to provide a visual (e.g., graphical) display such as a histogram, a graphical representation on a clock, and the like. FIG. 3 is a screen rendering of an example graphical user interface (GUI) 300 for providing mapping service output on a display, such as a display of the computing device 108, based on travel time variability prediction. In the example of FIG. 3, the user 110 may have specified at least a destination 116 of a trip between an origin 114 and the destination. The recommended route 118 may be output to the user as a route 118, among a plurality of candidate routes 118, that minimizes the $80^{th}$ percentile of driving time along the route, which is determined from the prediction of the probability distribution of driving time for each of the candidate routes 118.

In addition to the recommended route 118, the GUI 300 may provide a measure of travel time 302 that is based on the predicted probability distribution 206 of travel time for the route 118. The measure of travel time 302 shown in FIG. 3 includes a range of likely travel times (e.g., 17 to 20 minutes of driving time). FIG. 3 also shows an example of providing an indication 304 to the user that the predicted travel time 302 is based on a variability prediction. In this example, the indication 304 is an explanation to the user 110 that the "driving time range includes 95% of the predicted travel time distribution 206 for the recommended route 118. The GUI 300 may further include a visual representation 306 of the measure of predicted travel time 302. For example, the visual representation 306 may comprise a graphical representation of a clock showing the range of arrival time when the user 110 can expect to arrive at the destination 116.

The GUI 300 also shows an interactive tool 308 that may provide the user 110 with the ability to adjust his risk tolerance to tune the output of the driving time prediction 302. For example, the interactive tool 308 provides the user 110 the ability to slide a bar toward the right to "Risk-Averse" if he would like a more conservative travel time estimate, or toward the left to "Risk-Tolerant" if he is fine with a more liberal travel time estimate.

Example Processes

Figure 4:
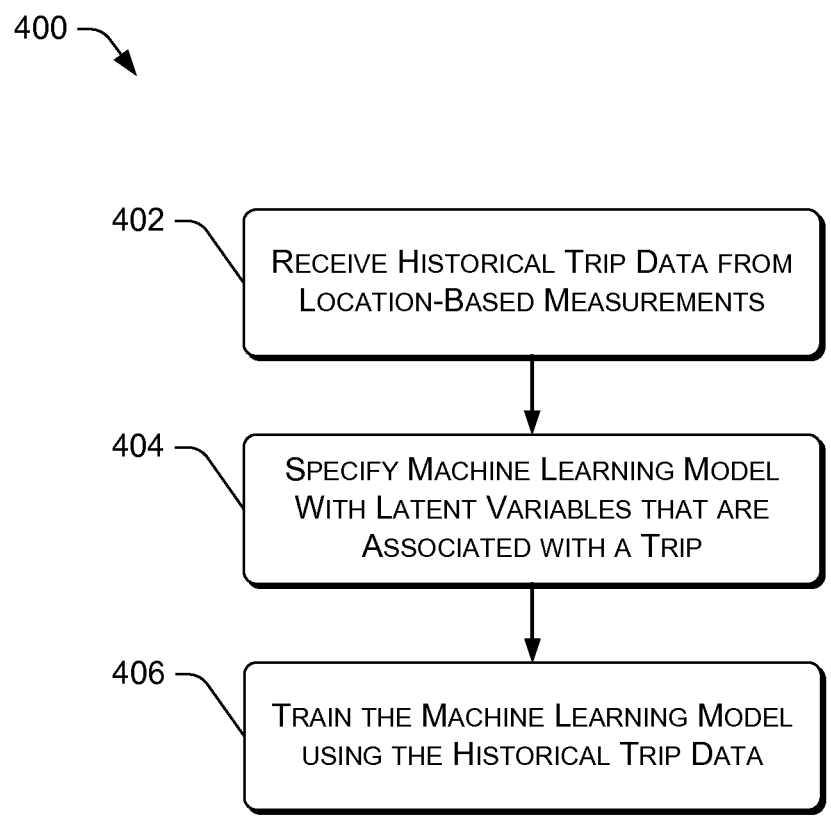
FIG. 4 is a flow diagram of an example process of building a machine learning model that can be implemented to predict a probability distribution of travel time for a trip at a specified time.
Figure 5:
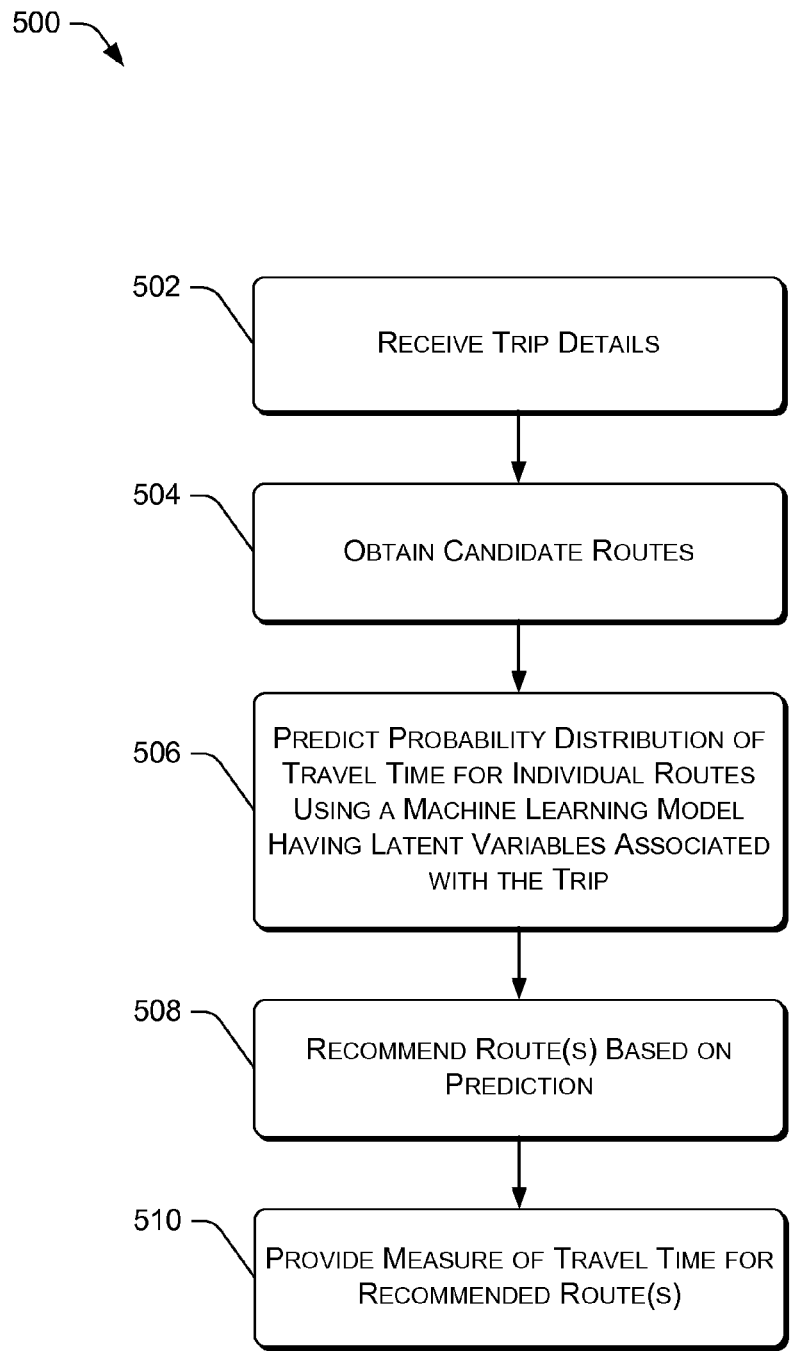
FIG. 5 is a flow diagram of an example process of predicting a probability distribution of travel time for a trip.

FIGS. 4 and 5 illustrate example processes that may be carried out to perform the techniques described herein. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, in some embodiments, one or more blocks of the processes may be omitted entirely.

FIG. 4 is a flow diagram of an example process 400 of building and training a machine learning model 102 that can be implemented to predict a probability distribution 206 of travel time for a trip at a specified time. For convenience, the process 400 is described with reference to the architecture 100 of FIG. 1 and the system 200 of FIG. 2.

At 402, a computing device, such as the remote computing resource(s) 128, may receive historical trip data 106 (or mobility data 106). The historical trip data 106 may come from any suitable source, such as a third party data aggregator that sells or leases data to an entity maintaining and operating the remote computing resource(s) 128. The historical trip data 106 may originate from mobile devices, or other location-aware devices, report that location-based measurements including at least location data and time data. For example, the historical trip data 106 may include travel time information, or information from which travel time can be derived. For instance, GPS data from mobile phones typically includes a location, heading, speed, and a time stamp which may be useful in deriving travel time on a route when periodic measurements are reported.

At 404, a machine learning model 102 may be specified that includes latent variables 104 associated with a trip. For instance, the latent variables 104 included in the machine learning model 102 may include, without limitation, a "trip effect" that captures the extent to which a particular trip is faster or slower than usual on all the road segments that make up the route 118, "autoregressive" effects that capture the fact that the travel speed tends to be similar for road segments that are close to each other in the route 118, and/or latent categorical variables capturing for example the level of congestion on links, the dependence of which may be modeled across links.

At 406, the model training component 138 may train the machine learning model 102 using the historical trip data 106. For a parametric model, training may include estimating parameters of the model, including the latent variables 104 included in the model.

FIG. 5 is a flow diagram of an example process 500 of predicting a probability distribution 206 of travel time for a trip. For convenience, the process 500 is described with reference to the architecture 100 of FIG. 1 and the system 200 of FIG. 2.

At 502, the input component 202 may receive at least an origin 114, a destination 116, and a start time associated with a trip. In some embodiments, other trip details, such as contextual data (e.g., weather conditions, traffic conditions, etc.) may be received at 502.

At 504, the route generator 204 may obtain candidate routes 118 that run from the origin 114 to the destination 116. The candidate route selection by the route generator 204 may be based in part on the average travel time associated with the individual candidate routes, which may be obtained from the model 102.

At 506, the prediction component 126 may predict, based at least in part on a machine learning model 102 that includes random effects 104 that are associated with the trip, a probability distribution 206 of travel time for individual ones of the candidate routes 118. The use of random effects 104 associated with the trip solves the "dependence problem" by capturing the relationship of the travel times on different road segments of the trip.

In some embodiments, the machine learning model 102 can be used to update the travel time prediction enroute. For example, as a user 110 is traveling on the route 118, the prediction component 126 may treat the current location of the user 110 as an origin for a newly predicted travel time variability. That is, based on the current position of the user 110 on the route 118, the remainder of the route 118 may be treated as though it is a route in and of itself in making a real-time, updated prediction of travel time variability. In some embodiments, past traveled segments may be evaluated to determine travel times, speed, or other useful information associated with those past traveled segments, and then update the prediction based on the evaluation of past traveled segments of the trip.

At 508, output component 212 (perhaps with the use of the ranker 210) recommends one or more routes 118 from the candidate routes 118 that satisfy or minimize a criterion based at least in part on the probability distribution 206 predicted at 506. For instance, the route(s) 118 that minimize the $80^{th}$ percentile of travel time may be selected for recommendation at 508.

At 510, the output component 212 may provide a measure of travel time for the recommended route(s) 118. In at least some instances, this may include a measure that indicates the use of the probability distribution 206. For instance, the measure may provide an estimation of the travel time that is based on the $80^{th}$ percentile of driving time, and possibly an indication that it is the $80^{th}$ percentile of driving time.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE ONE

A system for predicting variability of travel time for a trip and utilizing the predicted variability for route planning, the system comprising: one or more processors; and memory storing instructions that are executable by the one or more processors, the memory including: an input component to receive an origin, a destination, and a start time associated with the trip; a route generator to obtain candidate routes that run from the origin to the destination; a prediction component to predict, based at least in part on a machine learning model that includes latent variables that are associated with the trip, a probability distribution of travel time for individual ones of the candidate routes; and an output component to: recommend one or more routes from the candidate routes based at least in part on a criterion that is based at least in part on the probability distribution; and provide a measure of travel time for individual ones of the recommended one or more routes.

EXAMPLE TWO

The system of Example One, further comprising a ranker to, prior to the output component recommending the one or more routes, rank the candidate routes according to routes that minimize the criterion.

EXAMPLE THREE

The system of any of the previous examples, alone or in combination, wherein the criterion comprises at least one of a percentile of travel time, or a probability that arrival at the destination will occur before a specified time.

EXAMPLE FOUR

The system of any of the previous examples, alone or in combination, wherein the latent variables included in the machine learning model comprise unobserved quantities capturing a probabilistic dependence of travel times on different segments of the trip.

EXAMPLE FIVE

The system of any of the previous examples, alone or in combination, wherein the latent variables include at least one of: a latent variable that captures trip-level variability of travel time as an extent to which a particular trip is faster or slower than usual on all segments that make up a route for the trip; a latent variable that captures segment-level variability of travel time as a tendency for travel speeds to be similar for segments of a route for the trip that are close to each other in the route; or a latent variable capturing a level of congestion on segments.

EXAMPLE SIX

The system of any of the previous examples, alone or in combination, wherein the measure of travel time comprises a range of travel times.

EXAMPLE SEVEN

The system of any of the previous examples, alone or in combination, wherein the range of travel times is depicted in a graphical representation on a display of the system.

EXAMPLE EIGHT

The system of any of the previous examples, alone or in combination, further comprising a user interface to provide an interactive virtual tool for adjusting a level of risk aversion for a user that, upon adjustment of the level of risk, causes adjustment of the criterion.

EXAMPLE NINE

A computer-implemented method comprising: receiving an origin, a destination, and a start time associated with a trip; obtaining candidate routes that run from the origin to the destination; predicting, based at least in part on a machine learning model that includes random effects that are associated with the trip, a probability distribution of travel time for individual ones of the candidate routes; recommending one or more routes from the candidate routes based at least in part on a criterion that is based at least in part on the probability distribution; and providing a measure of travel time for individual ones of the recommended one or more routes.

EXAMPLE TEN

The method of Example Nine, wherein the criterion comprises at least one of a percentile of travel time, or a probability that arrival at the destination will occur before a specified time.

EXAMPLE ELEVEN

The computer-implemented method of any of the previous examples, alone or in combination, wherein the latent variables included in the machine learning model comprise unobserved quantities capturing a probabilistic dependence of travel times on different segments of the trip.

EXAMPLE TWELVE

The computer-implemented method of any of the previous examples, alone or in combination, wherein the latent variables include at least one of: a latent variable that captures trip-level variability of travel time as an extent to which a particular trip is faster or slower than usual on all segments that make up a route for the trip; a latent variable that captures segment-level variability of travel time as a tendency for travel speeds to be similar for segments of a route for the trip that are close to each other in the route; or a latent variable capturing a level of congestion on segments.

EXAMPLE THIRTEEN

The computer-implemented method of any of the previous examples, alone or in combination, wherein the measure of travel time comprises a range of travel times.

EXAMPLE FOURTEEN

The computer-implemented method of any of the previous examples, alone or in combination, further comprising: providing, via a user interface, an interactive virtual tool for adjusting a level of risk aversion for a user; receiving an adjustment of the level of risk via the interactive virtual tool; and adjusting the criterion up or down based on the adjustment.

EXAMPLE FIFTEEN

A computer-implemented method of training a machine learning model to be used for predicting a probability distribution of travel time for a trip, the method comprising: receiving historical trip data that is based at least in part on location-based measurements reported from mobile devices, individual ones of the location-based measurements including at least location data and time data; and training a machine learning model using the historical trip data, the machine learning model including latent variables that are associated with the trip from an origin to a destination.

EXAMPLE SIXTEEN

The computer-implemented method of Example Fifteen, further comprising testing a performance of the machine learning model in predicting the probability distribution of travel time by applying the machine learning model to a portion of the historical trip data that was not used to train the machine learning model.

EXAMPLE SEVENTEEN

The computer-implemented method of any of the previous examples, alone or in combination, wherein the performance of the machine learning model is measured by at least one of: a measure of accuracy of a 95% interval prediction of travel time; or a measure of accuracy of a point prediction of travel time.

EXAMPLE EIGHTEEN

The computer-implemented method of any of the previous examples, alone or in combination, periodically retraining the machine learning model with newly received historical trip data since the training.

EXAMPLE NINETEEN

The computer-implemented method of any of the previous examples, alone or in combination, wherein the re-training occurs upon receipt of a threshold amount of the newly received historical trip data.

EXAMPLE TWENTY

The computer-implemented method of any of the previous examples, alone or in combination, wherein the latent variables included in the machine learning model comprise unobserved quantities capturing a probabilistic dependence of travel times on different segments of the trip.

EXAMPLE TWENTY-ONE

A system for predicting variability of travel time for a trip and utilizing the predicted variability for route planning, the system comprising: means for executing computer-executable instructions (e.g., processors, including, for example, hardware processors such as central processing units (CPUs), system on chip (SoC), etc.); and a means for storing computer-executable instructions (e.g., memory, computer readable storage media such as RAM, ROM, EEPROM, flash memory, etc.), the means for storing including: means for receiving input in the form of an origin, a destination, and a start time associated with the trip; means for generating candidate routes that run from the origin to the destination; means for predicting, based at least in part on a machine learning model that includes latent variables that are associated with the trip, a probability distribution of travel time for individual ones of the candidate routes; and means for providing output in the form of: recommending one or more routes from the candidate routes based at least in part on a criterion that is based at least in part on the probability distribution; and providing a measure of travel time for individual ones of the recommended one or more routes.

EXAMPLE TWENTY-TWO

The system of Example Twenty-One, further comprising means for providing an interactive virtual tool for adjusting a level of risk aversion for a user that, upon adjustment of the level of risk, causes adjustment of the criterion.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for predicting variability of travel time for a trip and utilizing the predicted variability for route planning, the system comprising:
a display;
one or more processors; and
memory storing instructions that when executed by the one or more processors, cause the one or more processors to perform a method comprising:
receiving an origin, a destination, and a start time associated with the trip;
receiving candidate routes that run from the origin to the destination, each candidate route comprising a plurality of individual route segments;
generating, using a machine learning model, a variability in a measure of travel time for each candidate route, wherein the machine learning model:
captures a variability in a travel time of each individual route segment within the candidate route;
captures a variability in a travel time of the candidate route; and
captures interdependencies of travel times on sequential individual route segments within the candidate route, the interdependencies comprising one or more latent variables that capture relationships of the travel times on the individual route segments;
selecting at least one route from the candidate routes based on a criterion that is based at least in part on each variability in the measure of travel time; and
causing, on the display, a presentation of a user interface configured to:
graphically display the selected at least one route; and
graphically display a measure of travel time for the selected at least one route.

2. The system of claim 1, the method further comprising prior to graphically displaying the selected at least one route, ranking the candidate routes according to routes that minimize the criterion.

3. The system of claim 1, wherein the criterion comprises at least one of a percentile of travel time or a probability that arrival at the destination will occur before a specified time.

4. The system of claim 1, wherein the one or more latent variables included in the machine learning model comprise one or more latent variables that capture unobserved quantities capturing for each candidate route a probabilistic dependence of a first travel time of a first segment of the candidate route on a second travel time of a second segment of the candidate route.

5. The system of claim 1, wherein the one or more latent variables include at least one of:
a latent variable that captures trip-level variability of travel time as an extent to which travel speed is faster or slower than usual on all segments that make up a candidate route of the candidate routes for the trip;
a latent variable that captures segment-level variability of travel time as a tendency for travel speeds to be similar for segments of the candidate route that are close to each other in the candidate route; or
a latent variable capturing a level of congestion on the segments that make up the candidate route.

6. The system of claim 1, wherein the measure of travel time comprises a range of travel times.

7. The system of claim 1, the user interface being further configured to provide an interactive virtual tool for adjusting a level of risk aversion for a user that, upon adjustment of the level of risk, causes adjustment of the criterion.

8. A computer-implemented method comprising:
receiving an origin, a destination, and a start time associated with a trip;
obtaining candidate routes that run from the origin to the destination;

predicting, based at least in part on a machine learning model, a variability in a measure of travel time for each candidate route, wherein the machine learning model:
captures a variability in a travel time of each individual route segment within the candidate route;
captures a variability in a travel time of the candidate route;
captures interdependencies of travel times on sequential individual route segments within the candidate route, the interdependencies comprising one or more latent variables that capture relationships of the travel times on the individual route segments; and
captures an effect of contextual data on a travel time of the candidate route, the contextual data comprising one or more of a time of a day, a day of a week, weather information, or traffic information;
providing a recommendation of one or more routes from the candidate routes based at least in part on the variabilities in the measure of travel times; and
providing a measure of travel time for the recommended one or more routes.

9. The computer-implemented method of claim 8, wherein providing the recommendation of one or more routes from the candidate routes based at least in part on the variabilities in the measure of travel times comprises providing the recommendation of one or more routes from the candidate routes based at least in part on a criterion that is based at least in part on the variabilities in the measure of travel times, the criterion comprising at least one of a percentile of travel time or a probability that arrival at the destination will occur before a specified time.

10. The computer-implemented method of claim 8, wherein the one or more latent variables comprise latent variables that capture unobserved quantities capturing, for each candidate route of the candidate routes, a probabilistic dependence of a first travel time of a first segment of the candidate route on a second travel time of a second segment of the candidate route.

11. The computer-implemented method of claim 8, wherein the one or more latent variables comprise at least one of:
a latent variable that captures trip-level variability of travel time as an extent to which travel speed is faster or slower than usual on all segments that make up a candidate route for the trip;
a latent variable that captures segment-level variability of travel time as a tendency for travel speeds to be similar for segments of the candidate route that are close to each other in the candidate route; or
a effect latent variable capturing a level of congestion on the segments that make up the candidate route.

12. The computer-implemented method of claim 8, wherein the variability in the measure of travel time comprises a range of travel times having an upper bound travel time and a lower bound travel time.

13. The computer-implemented method of claim 9, further comprising:
providing, via a user interface, an interactive virtual tool for adjusting a level of risk aversion for a user;
receiving an adjustment of the level of risk aversion via the interactive virtual tool; and
adjusting the criterion up or down based on the adjustment.

14. A computer-implemented method of training a machine learning model to be used for predicting a probability distribution of travel time for a trip, the method comprising:
receiving historical trip data that is based at least in part on location-based measurements reported from mobile devices, individual ones of the location-based measurements including at least location data and time data; and
training, using the historical trip data, a machine learning model to generate probability distributions of travel times for one or more candidate routes, wherein the training of the machine learning model comprises:
capturing a variability in a travel time of each individual route segment within the candidate route;
capturing a variability in a travel time of the candidate route;
capturing interdependencies of travel times on sequential individual route segments within the candidate route, the interdependencies comprising one or more latent variables that capture relationships of the travel times on the individual route segments; and
capturing an effect of contextual data on a travel time of the candidate route, the contextual data comprising one or more of a time of a day, a day of a week, weather information, or traffic information.

15. The computer-implemented method of claim 14, further comprising testing a performance of the machine learning model in predicting the probability distribution of travel time by applying the machine learning model to a portion of the historical trip data that was not used to train the machine learning model.

16. The computer-implemented method of claim 15, wherein the performance of the machine learning model is measured by at least one of:
a measure of accuracy of a 95% interval prediction of travel time; or
a measure of accuracy of a point prediction of travel time.

17. The computer-implemented method of claim 14, further comprising periodically retraining the machine learning model with newly received historical trip data since the training.

18. The computer-implemented method of claim 17, wherein the retraining occurs upon receipt of a threshold amount of the newly received historical trip data.

19. The computer-implemented method of claim 14, wherein the one or more latent variables comprise one or more latent variables that capture unobserved quantities capturing, for each candidate route that runs from the origin to the destination, a probabilistic dependence of a first travel time of a first segment of the candidate route on a second travel time of a second segment of the candidate route.

20. The computer-implemented method of claim 8, wherein the user interface is further configured to provide an interactive virtual tool for adjusting a level of risk aversion for a user that, upon adjustment of the level of risk, causes adjustment of the criterion.

* * * * *